US012477725B2

(12) United States Patent
Purayath et al.

(10) Patent No.: US 12,477,725 B2
(45) Date of Patent: Nov. 18, 2025

(54) METHODS FOR FABRICATING A 3-DIMENSIONAL MEMORY STRUCTURE OF NOR MEMORY STRINGS

(71) Applicant: SUNRISE MEMORY CORPORATION, San Jose, CA (US)

(72) Inventors: Vinod Purayath, Sedona, AZ (US); Eli Harari, Saratoga, CA (US)

(73) Assignee: SUNRISE MEMORY CORPORATION, San Jose, CA (US)

( * ) Notice: Subject to any disclaimer, the term of this patent is extended or adjusted under 35 U.S.C. 154(b) by 731 days.

(21) Appl. No.: 17/382,064

(22) Filed: Jul. 21, 2021

(65) Prior Publication Data

US 2022/0028876 A1     Jan. 27, 2022

Related U.S. Application Data

(60) Provisional application No. 63/054,743, filed on Jul. 21, 2020.

(51) Int. Cl.
| | |
|---|---|
| *H10B 41/35* | (2023.01) |
| *G11C 16/04* | (2006.01) |
| *H10B 41/10* | (2023.01) |
| *H10B 41/27* | (2023.01) |
| *H10B 43/10* | (2023.01) |
| *H10B 43/27* | (2023.01) |
| *H10B 43/35* | (2023.01) |

(52) U.S. Cl.
CPC ......... *H10B 41/35* (2023.02); *G11C 16/0483* (2013.01); *H10B 41/10* (2023.02); *H10B 41/27* (2023.02); *H10B 43/10* (2023.02); *H10B 43/27* (2023.02); *H10B 43/35* (2023.02)

(58) Field of Classification Search
CPC .. H10B 43/50; H10B 20/50; H10B 41/20–27; H10B 43/20–27; H10B 43/10; H10B 43/35; H10D 64/037
See application file for complete search history.

(56) References Cited

U.S. PATENT DOCUMENTS

| | | |
|---|---|---|
| 5,583,808 A | 12/1996 | Brahmbhatt |
| 5,646,886 A | 7/1997 | Brahmbhatt |
| 5,656,842 A | 8/1997 | Iwamatsu |
| 5,768,192 A | 6/1998 | Eitan |
| 5,789,776 A | 8/1998 | Lancaster et al. |

(Continued)

FOREIGN PATENT DOCUMENTS

| | | |
|---|---|---|
| CN | 203760476 U | 8/2014 |
| CN | 111799263 A | 10/2020 |

(Continued)

OTHER PUBLICATIONS

Wu, Jixuan, et al., "A Monolithic 3D Integration of RRAM Array with Oxide Semiconductor FET for In-Memory Computing in Quantized Neural Network AI Applications", 2020 IEEE Symposium on VLSI Technology Digest of Technical Papers, Honolulu, HI, USA, Jun. 2020, 4 pages.

(Continued)

*Primary Examiner* — Julio J Maldonado
*Assistant Examiner* — Stanetta D Isaac

(57) ABSTRACT

A process for manufacturing a 3-D NOR memory array provides thin-film storage transistors of each NOR memory string in either shafts or portions of a trench between adjacent shafts.

31 Claims, 15 Drawing Sheets

(56) References Cited

U.S. PATENT DOCUMENTS

| | | |
|---|---|---|
| 5,915,167 A | 6/1999 | Leedy |
| 6,040,605 A | 3/2000 | Sano et al. |
| 6,107,133 A | 8/2000 | Furukawa et al. |
| 6,118,171 A | 9/2000 | Davies et al. |
| 6,130,838 A | 10/2000 | Kim et al. |
| 6,313,518 B1 | 11/2001 | Ahn et al. |
| 6,362,508 B1 | 3/2002 | Rasovaky et al. |
| 6,434,053 B1 | 8/2002 | Fujiwara |
| 6,580,124 B1 | 6/2003 | Cleeves et al. |
| 6,587,365 B1 | 7/2003 | Salling |
| 6,744,094 B2 | 6/2004 | Forbes |
| 6,774,458 B2 | 8/2004 | Fricke et al. |
| 6,781,858 B2 | 8/2004 | Fricke et al. |
| 6,873,004 B1 | 3/2005 | Han et al. |
| 6,946,703 B2 | 9/2005 | Ryu et al. |
| 7,005,350 B2 | 2/2006 | Walker et al. |
| 7,223,653 B2 | 5/2007 | Cheng et al. |
| 7,307,308 B2 | 12/2007 | Lee |
| 7,489,002 B2 | 2/2009 | Forbes et al. |
| 7,524,725 B2 | 4/2009 | Chung |
| 7,612,411 B2 | 11/2009 | Walker |
| 8,026,521 B1 | 9/2011 | Or-Bach et al. |
| 8,139,418 B2 | 3/2012 | Carman |
| 8,178,396 B2 | 5/2012 | Sinha et al. |
| 8,278,183 B2 | 10/2012 | Lerner |
| 8,383,482 B2 | 2/2013 | Kim et al. |
| 8,630,114 B2 | 1/2014 | Lue |
| 8,767,473 B2 | 7/2014 | Shim et al. |
| 8,848,425 B2 | 9/2014 | Schloss |
| 8,878,278 B2 | 11/2014 | Alsmeier et al. |
| 8,923,057 B2 | 12/2014 | Son et al. |
| 9,190,293 B2 | 11/2015 | Wang et al. |
| 9,202,694 B2 | 12/2015 | Konevecki et al. |
| 9,230,985 B1 | 1/2016 | Wu et al. |
| 9,281,044 B2 | 3/2016 | Ramaswamy et al. |
| 9,397,114 B2 | 7/2016 | Yun et al. |
| 9,412,752 B1 | 8/2016 | Yeh et al. |
| 9,698,152 B2 | 7/2017 | Peri |
| 9,711,529 B2 | 7/2017 | Hu et al. |
| 9,748,172 B2 | 8/2017 | Takaki |
| 9,842,651 B2 | 12/2017 | Harari |
| 9,892,800 B2 | 2/2018 | Harari |
| 9,911,497 B1 | 3/2018 | Harari |
| 10,014,317 B2 | 7/2018 | Peng |
| 10,074,667 B1 | 9/2018 | Higashi |
| 10,096,364 B2 | 10/2018 | Harari |
| 10,121,553 B2 | 11/2018 | Harari |
| 10,157,780 B2 | 12/2018 | Wu et al. |
| 10,249,370 B2 | 4/2019 | Harari |
| 10,254,968 B1 | 4/2019 | Gazit et al. |
| 10,373,956 B2 | 8/2019 | Gupta et al. |
| 10,381,378 B1 | 8/2019 | Harari |
| 10,395,737 B2 | 8/2019 | Harari |
| 10,431,596 B2 | 10/2019 | Herner et al. |
| 10,475,812 B2 | 11/2019 | Harari |
| 10,622,377 B2 | 4/2020 | Harari et al. |
| 11,217,494 B1 | 1/2022 | Young et al. |
| 2001/0030340 A1 | 10/2001 | Fujiwara |
| 2001/0038132 A1 | 11/2001 | Ahn et al. |
| 2001/0053092 A1 | 12/2001 | Kosaka et al. |
| 2002/0028541 A1 | 3/2002 | Lee et al. |
| 2002/0051378 A1 | 5/2002 | Ohsawa |
| 2002/0193484 A1 | 12/2002 | Albee |
| 2004/0214387 A1 | 10/2004 | Madurawe et al. |
| 2004/0246807 A1 | 12/2004 | Lee |
| 2004/0262681 A1 | 12/2004 | Masuoka et al. |
| 2004/0262772 A1 | 12/2004 | Ramanathan et al. |
| 2005/0128815 A1 | 6/2005 | Ishikawa et al. |
| 2005/0236625 A1 | 10/2005 | Schuele et al. |
| 2005/0280061 A1 | 12/2005 | Lee |
| 2006/0155921 A1 | 7/2006 | Gorobets et al. |
| 2008/0149992 A1 | 6/2008 | Gidon |
| 2008/0160765 A1 | 7/2008 | Lee et al. |
| 2008/0212358 A1 | 9/2008 | Mitsui |
| 2008/0239812 A1 | 10/2008 | Naofumi et al. |
| 2009/0057722 A1 | 3/2009 | Masuoka et al. |
| 2009/0157946 A1 | 6/2009 | Arya |
| 2009/0237996 A1 | 9/2009 | Kirsch et al. |
| 2009/0279360 A1 | 11/2009 | Peter et al. |
| 2009/0316487 A1 | 12/2009 | Lee et al. |
| 2010/0124116 A1 | 5/2010 | Takashi et al. |
| 2011/0115011 A1 | 5/2011 | Masuoka et al. |
| 2011/0143519 A1 | 6/2011 | Lerner |
| 2011/0208905 A1 | 8/2011 | Shaeffer et al. |
| 2011/0298013 A1 | 12/2011 | Hwang et al. |
| 2012/0074478 A1 | 3/2012 | Sugimachi |
| 2012/0182801 A1 | 7/2012 | Lue |
| 2012/0223380 A1 | 9/2012 | Lee et al. |
| 2012/0243314 A1 | 9/2012 | Takashi |
| 2012/0307568 A1 | 12/2012 | Banna et al. |
| 2012/0327714 A1 | 12/2012 | Lue |
| 2013/0171788 A1 | 7/2013 | Yang et al. |
| 2013/0256780 A1 | 10/2013 | Kai et al. |
| 2013/0337646 A1 | 12/2013 | Cernea et al. |
| 2014/0015036 A1 | 1/2014 | Fursin et al. |
| 2014/0070289 A1 | 3/2014 | Tanaka et al. |
| 2014/0117366 A1 | 5/2014 | Saitoh |
| 2014/0151774 A1 | 6/2014 | Rhie |
| 2014/0213032 A1 | 7/2014 | Kai et al. |
| 2014/0247674 A1 | 9/2014 | Karda et al. |
| 2014/0252454 A1 | 9/2014 | Rabkin |
| 2014/0252532 A1 | 9/2014 | Yang et al. |
| 2014/0328128 A1 | 11/2014 | Louie et al. |
| 2014/0340952 A1 | 11/2014 | Ramaswamy et al. |
| 2015/0079743 A1 | 3/2015 | Pachamuthu et al. |
| 2015/0079744 A1 | 3/2015 | Hwang |
| 2015/0129955 A1 | 5/2015 | Mueller et al. |
| 2015/0187823 A1 | 7/2015 | Miyairi et al. |
| 2015/0194440 A1 | 7/2015 | Noh et al. |
| 2015/0206886 A1 | 7/2015 | Guha et al. |
| 2015/0249143 A1 | 9/2015 | Sano |
| 2015/0340371 A1 | 11/2015 | Lui |
| 2016/0049404 A1 | 2/2016 | Mariani et al. |
| 2016/0086953 A1 | 3/2016 | Liu |
| 2016/0086970 A1 | 3/2016 | Peng |
| 2016/0141294 A1 | 5/2016 | Peri et al. |
| 2016/0225860 A1 | 8/2016 | Karda et al. |
| 2016/0314042 A1 | 10/2016 | Plants |
| 2017/0053906 A1 | 2/2017 | Or-Bach et al. |
| 2017/0092370 A1 | 3/2017 | Harari |
| 2017/0092371 A1 | 3/2017 | Harari |
| 2017/0148517 A1 | 5/2017 | Harari |
| 2017/0148810 A1 | 5/2017 | Kai et al. |
| 2017/0358594 A1 | 12/2017 | Lu et al. |
| 2018/0108416 A1 | 4/2018 | Harari |
| 2018/0144977 A1* | 5/2018 | Yu .................. H01L 21/02126 |
| 2018/0151419 A1 | 5/2018 | Wu et al. |
| 2018/0269229 A1 | 9/2018 | Or-Bach et al. |
| 2018/0286918 A1 | 10/2018 | Bandyopadhyay et al. |
| 2018/0330791 A1 | 11/2018 | Li et al. |
| 2018/0342544 A1 | 11/2018 | Lee et al. |
| 2018/0366471 A1 | 12/2018 | Harari et al. |
| 2018/0366489 A1 | 12/2018 | Harari et al. |
| 2019/0006009 A1 | 1/2019 | Harari |
| 2019/0006385 A1* | 1/2019 | Kim .................. H01L 21/76877 |
| 2019/0019564 A1 | 1/2019 | Li et al. |
| 2019/0067327 A1* | 2/2019 | Herner .................. H10B 43/20 |
| 2019/0148286 A1 | 5/2019 | Or-Bach et al. |
| 2019/0157296 A1 | 5/2019 | Harari et al. |
| 2019/0180821 A1 | 6/2019 | Harari |
| 2019/0206890 A1 | 7/2019 | Harari et al. |
| 2019/0237470 A1 | 8/2019 | Mine et al. |
| 2019/0244971 A1 | 8/2019 | Harari |
| 2019/0259769 A1 | 8/2019 | Karda et al. |
| 2019/0304988 A1 | 10/2019 | Dong et al. |
| 2019/0319044 A1 | 10/2019 | Harari |
| 2019/0325964 A1 | 10/2019 | Harari |
| 2019/0348424 A1 | 11/2019 | Karda et al. |
| 2019/0355747 A1 | 11/2019 | Herner et al. |
| 2019/0370117 A1 | 12/2019 | Fruchtman et al. |
| 2020/0020718 A1 | 1/2020 | Harari et al. |
| 2020/0051990 A1 | 2/2020 | Harari et al. |
| 2020/0063263 A1 | 2/2020 | Yang et al. |
| 2020/0098738 A1 | 3/2020 | Herner et al. |

(56) References Cited

U.S. PATENT DOCUMENTS

| | | | |
|---|---|---|---|
| 2020/0098779 A1 | 3/2020 | Cernea et al. | |
| 2020/0098881 A1 | 3/2020 | Vellianitis | |
| 2020/0176468 A1 | 6/2020 | Herner et al. | |
| 2020/0203378 A1 | 6/2020 | Harari et al. | |
| 2020/0219572 A1 | 7/2020 | Harari | |
| 2020/0258897 A1 | 8/2020 | Yan et al. | |
| 2020/0350234 A1 | 11/2020 | Shan et al. | |
| 2020/0357822 A1 | 11/2020 | Chen | |
| 2020/0365609 A1 | 11/2020 | Harari | |
| 2021/0175251 A1 | 6/2021 | Zhang et al. | |
| 2021/0272983 A1 | 9/2021 | Gilbert et al. | |
| 2021/0375933 A1 | 12/2021 | Lu et al. | |
| 2021/0399015 A1 | 12/2021 | Lin et al. | |
| 2021/0407845 A1 | 12/2021 | Wang et al. | |
| 2022/0013535 A1* | 1/2022 | Lue | H10B 43/35 |
| 2022/0028876 A1 | 1/2022 | Purayath et al. | |
| 2022/0028886 A1 | 1/2022 | Pur et al. | |
| 2022/0139933 A1 | 5/2022 | Noack | |
| 2022/0231049 A1 | 7/2022 | Lin et al. | |
| 2022/0246766 A1 | 8/2022 | Manfrini et al. | |
| 2022/0254390 A1 | 8/2022 | Gans et al. | |
| 2022/0351776 A1 | 11/2022 | Nam et al. | |
| 2022/0384459 A1 | 12/2022 | Lu et al. | |
| 2022/0393031 A1 | 12/2022 | Ando et al. | |
| 2023/0012093 A1 | 1/2023 | Kakushima et al. | |
| 2023/0052477 A1 | 2/2023 | Ha et al. | |

FOREIGN PATENT DOCUMENTS

| | | | |
|---|---|---|---|
| KR | 20120085591 A1 | 8/2012 | |
| WO | 2018236937 A1 | 12/2018 | |

OTHER PUBLICATIONS

"PCT Search Report and Written Opinion, PCT/US2021/042607", Nov. 4, 2021, 17 pages.
"EP Extended Search Report EP168690149.3", Oct. 18, 2019.
"European Search Report, EP 16852238.1", Mar. 28, 2019.
"European Search Report, EP17844550.8", Aug. 12, 2020, 11 pages.
"Notification of Reasons for Refusal, Japanese Patent Application 2018-527740", (English translation), Nov. 4, 2020, 8 pages.
"Partial European Search Report EP 16869049.3", Jul. 1, 2019, pp. 1-12.
"PCT Search Report and Written Opinion, PCT/US2018/038373", Sep. 10, 2018.
"PCT Search Report and Written Opinion, PCT/US2019/014319", Apr. 15, 2019.
"PCT Search Report and Written Opinion, PCT/US2019/041678", Oct. 9, 2019.
"PCT Search Report and Written Opinion, PCT/US2019/052446", Dec. 11, 2019.
"PCT Search Report and Written Opinion, PCT/US2020/065670", Apr. 5, 2021, 12 pages.
Kim, N. , et al., "Multi-layered Vertical gate NANO Flash Overcoming Stacking Limit for Terabit Density Storage", Symposium on VLSI Tech. Dig. of Technical Papers, 2009, pp. 188-189.
Lue, H.T. , et al., "A Highly Scalable 8-Layer 3D Vertical-gate {VG} TFT NANO Flash Using Junction-Free Buried Channel BE-SONOS Device", Symposium on VLSI: Tech. Dig. Of Technical Papers, 2010, pp. 131-132.
Tanaka, T. , et al., "A 768 GB 3b/cell 3D-Floaling-Gate NANO Flash Memory", Digest of Technical Papers, the 2016 EEE International Solid-Slate Circuits Conference, 2016, pp. 142-144.
Wann, H.C. , et al., "High-Endurance Ultra-Thin Tunnel Oxide in Monos Device Structure for Dynamic Memory Application", IEEE Electron Device letters, vol. 16, No. 11, Nov. 1995, pp. 491-493.
"PCT Search Report and Written Opinion, PCT/US2022/039473", Dec. 6, 2022, 14 pages.

* cited by examiner

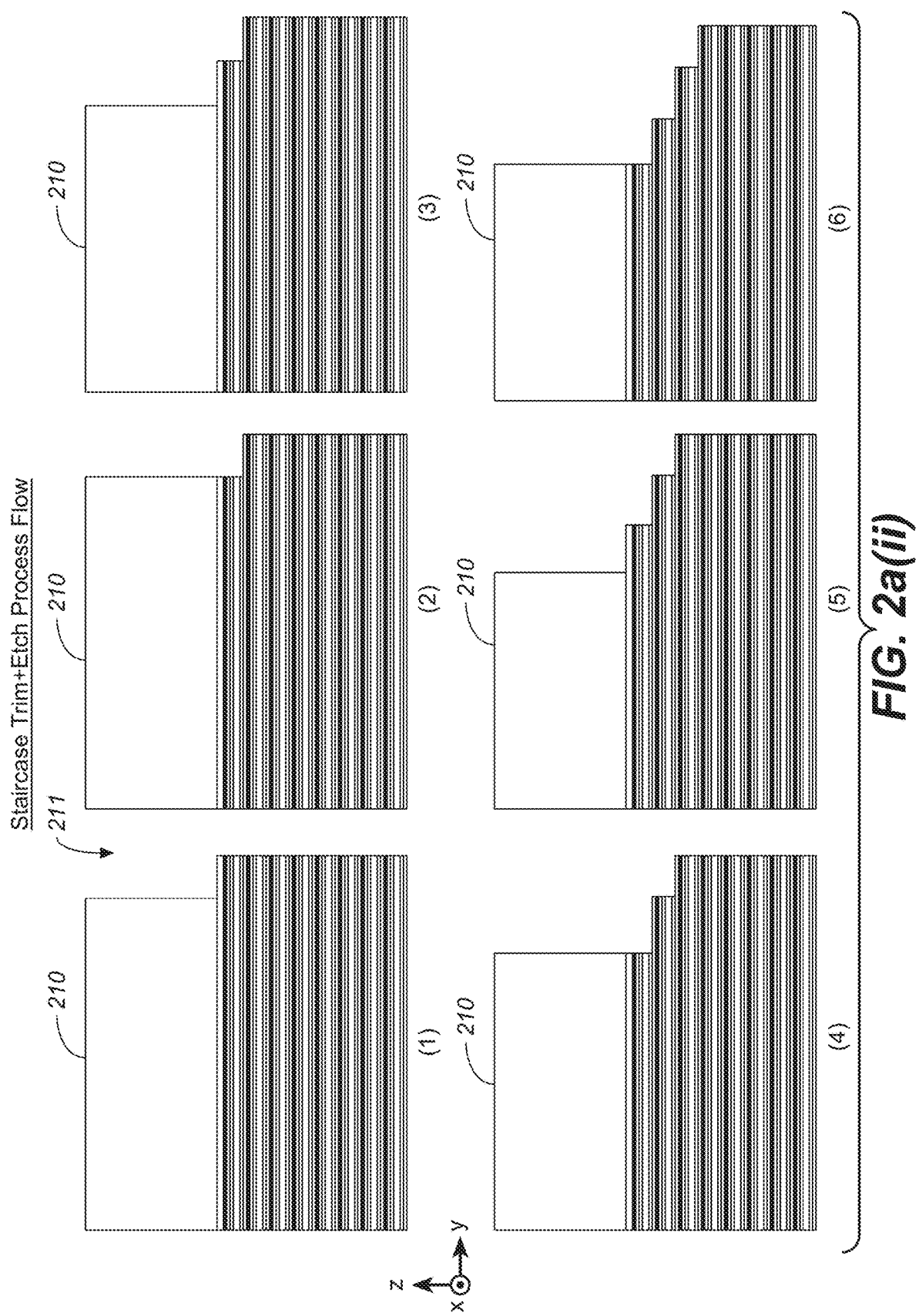
FIG. 2a(ii)

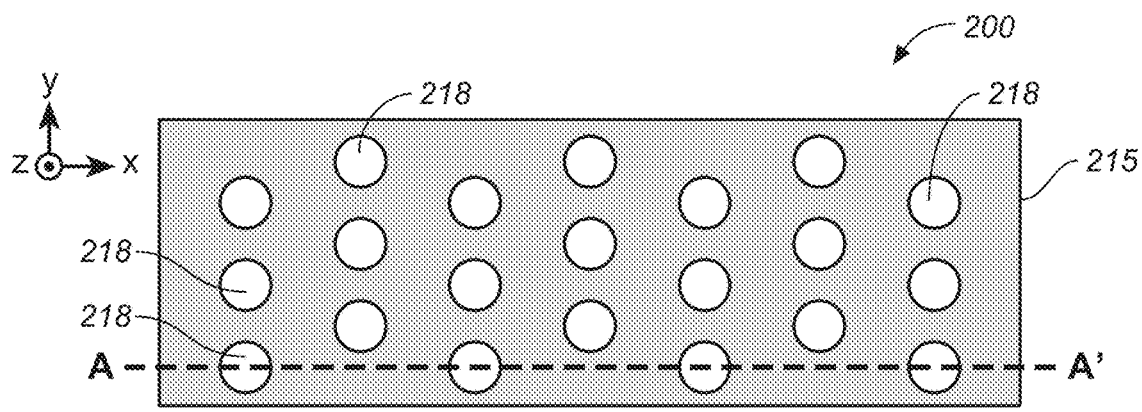
FIG. 2b(i)
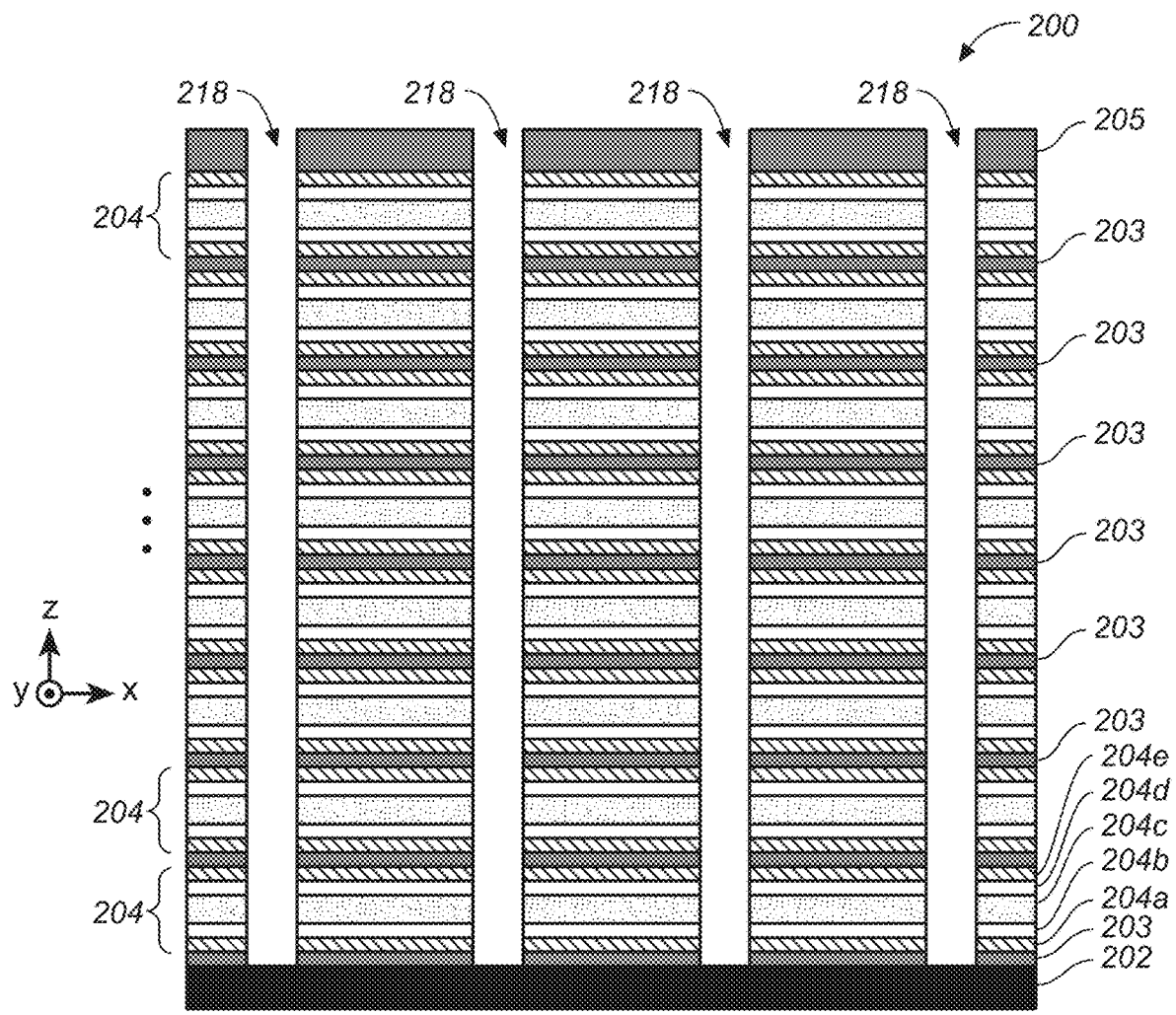
FIG. 2b(ii)

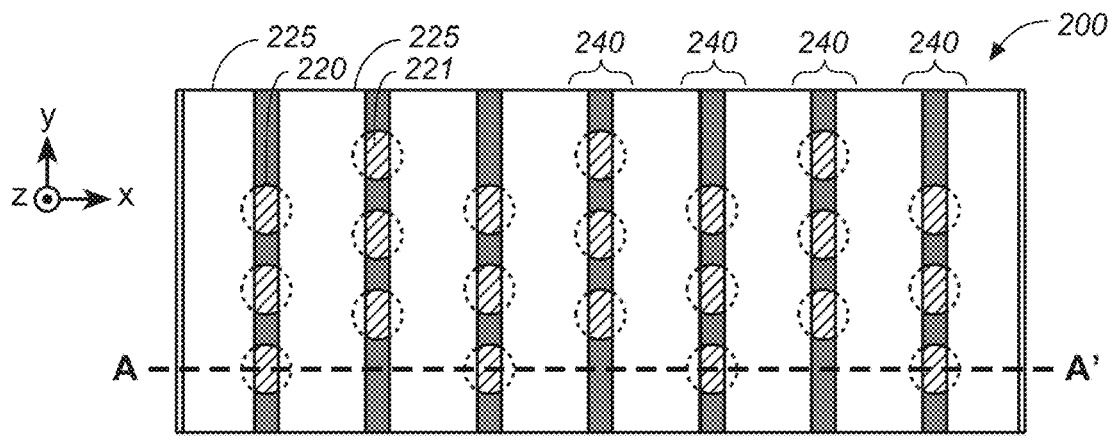
FIG. 2c(i)
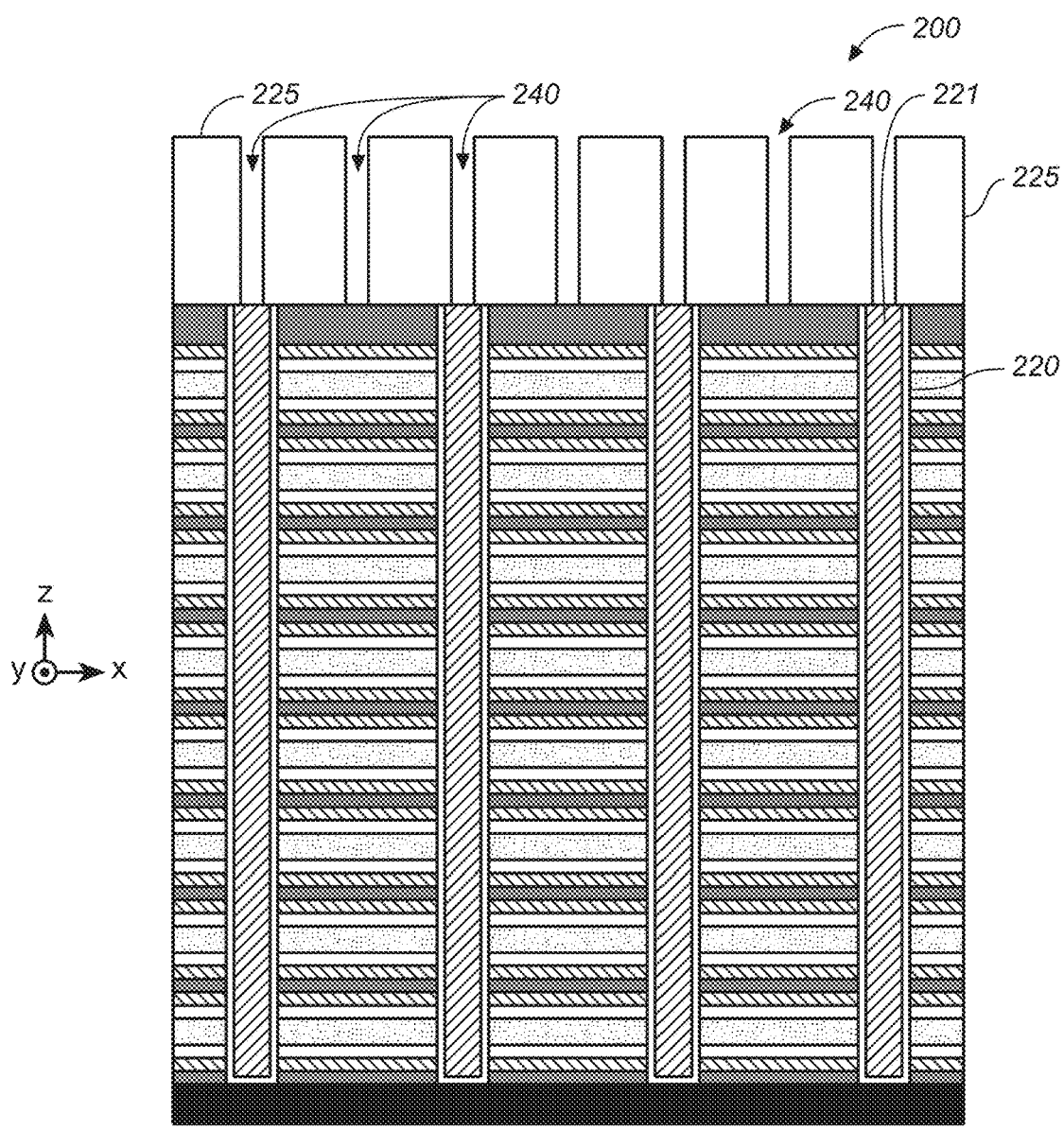
FIG. 2c(ii)

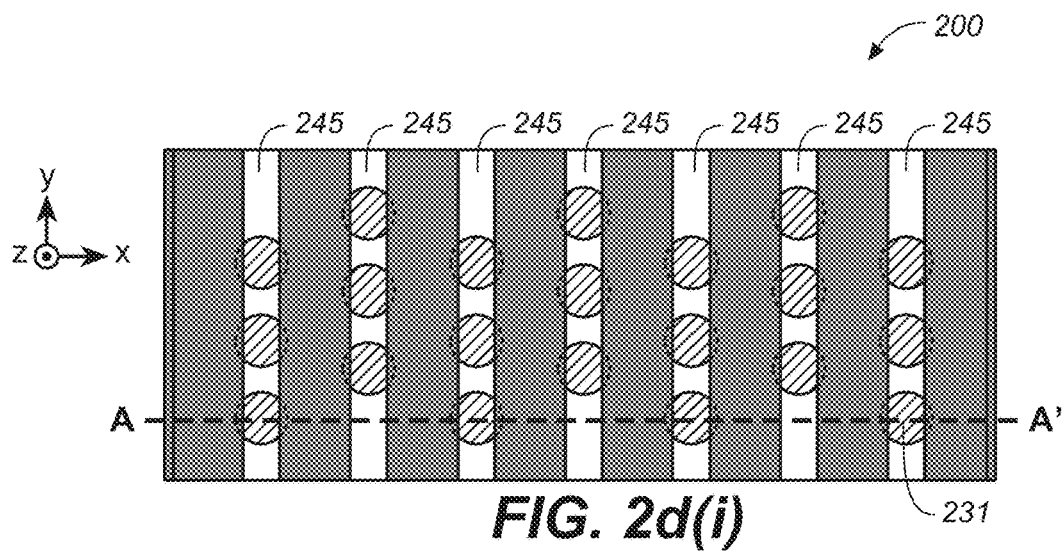
FIG. 2d(i)
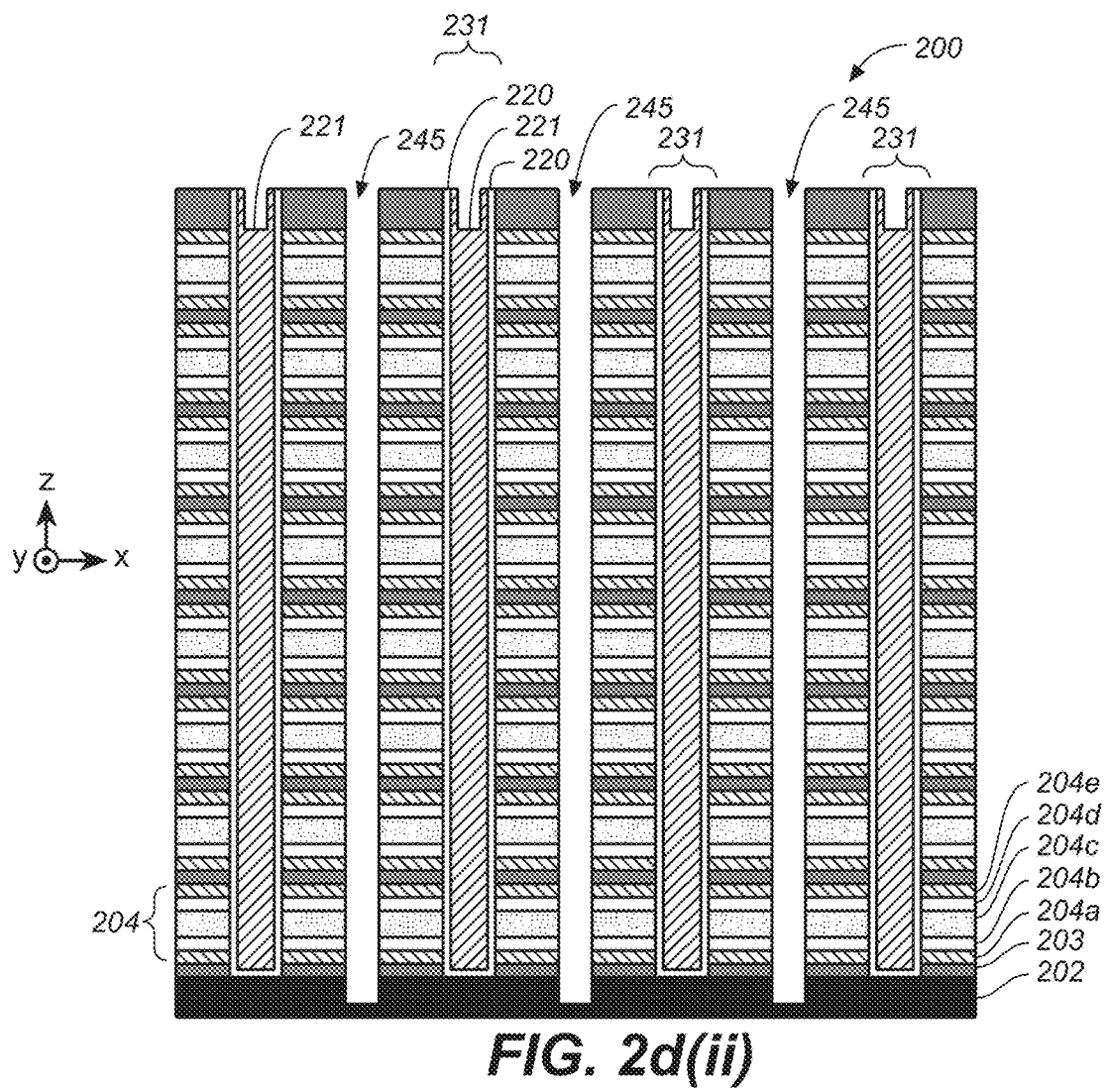
FIG. 2d(ii)

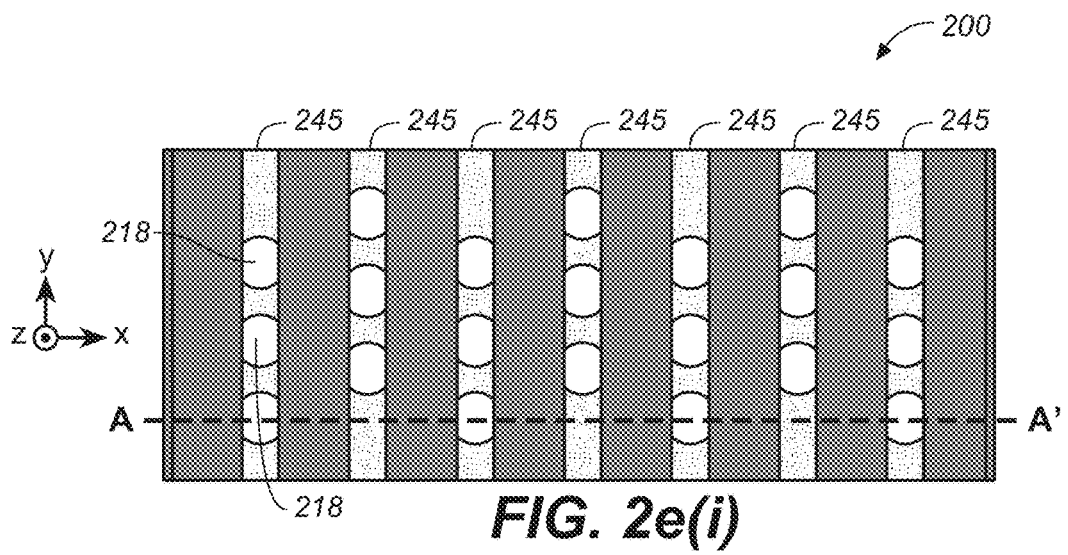
FIG. 2e(i)
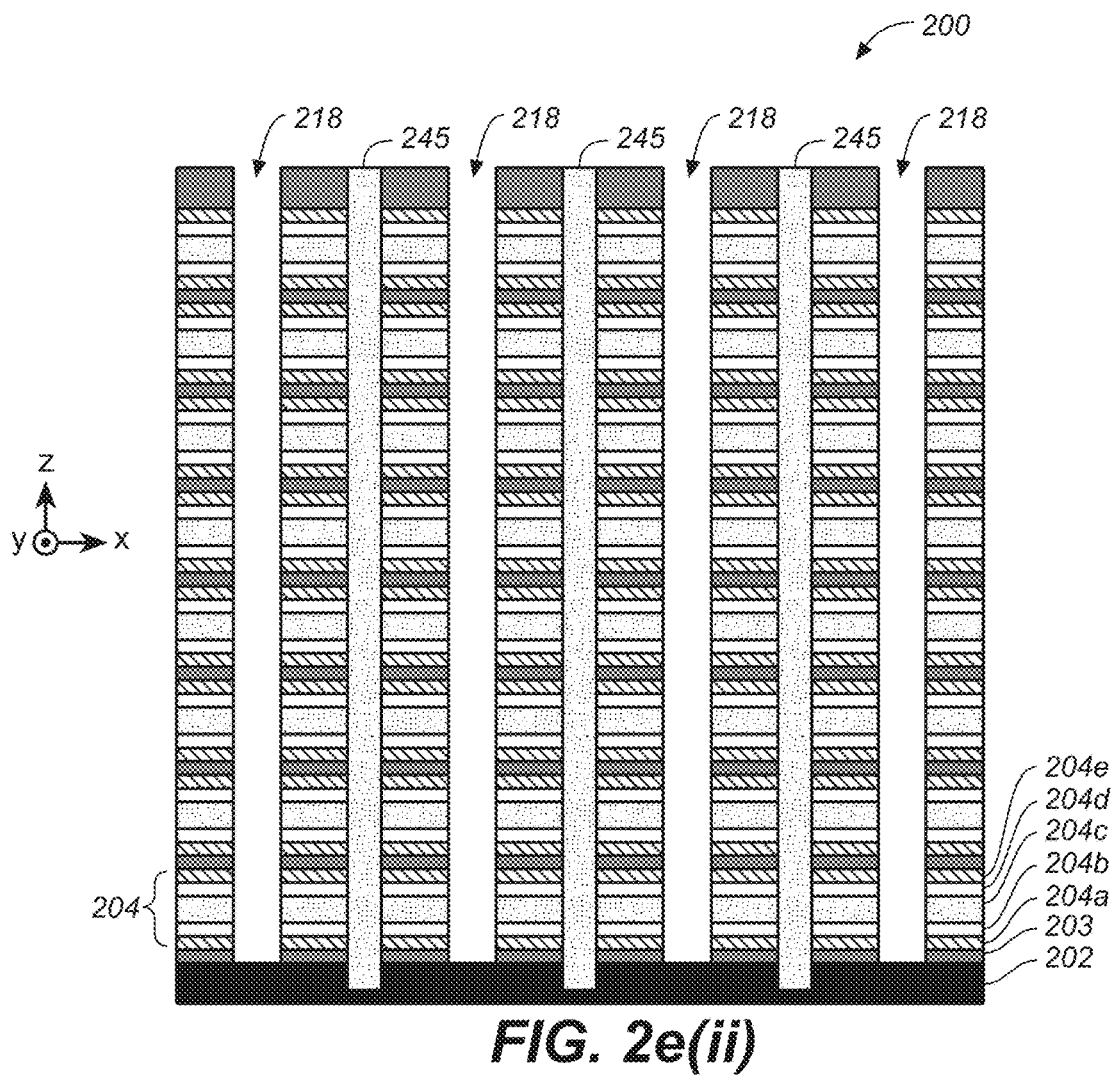
FIG. 2e(ii)

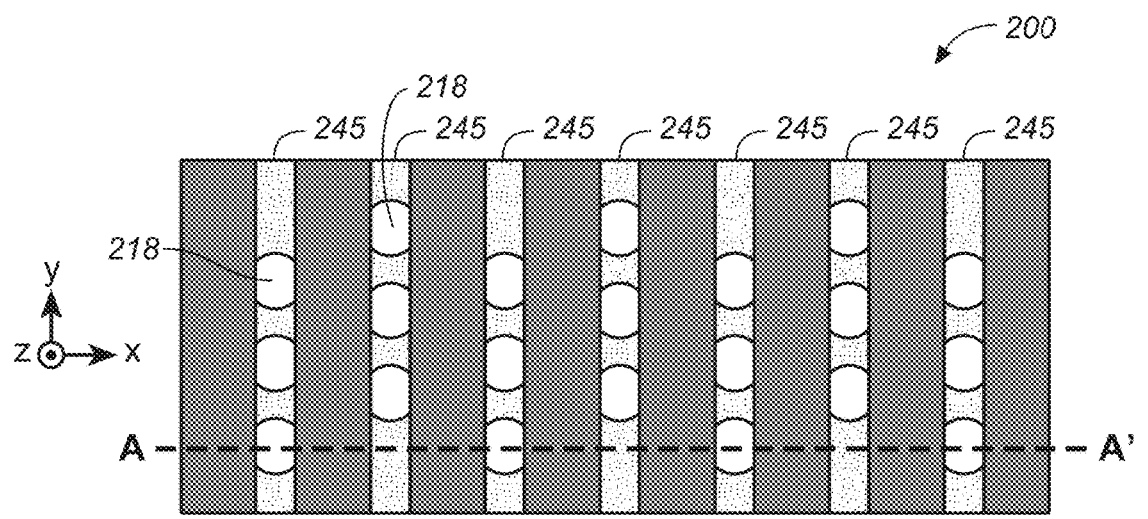
FIG. 2f(i)
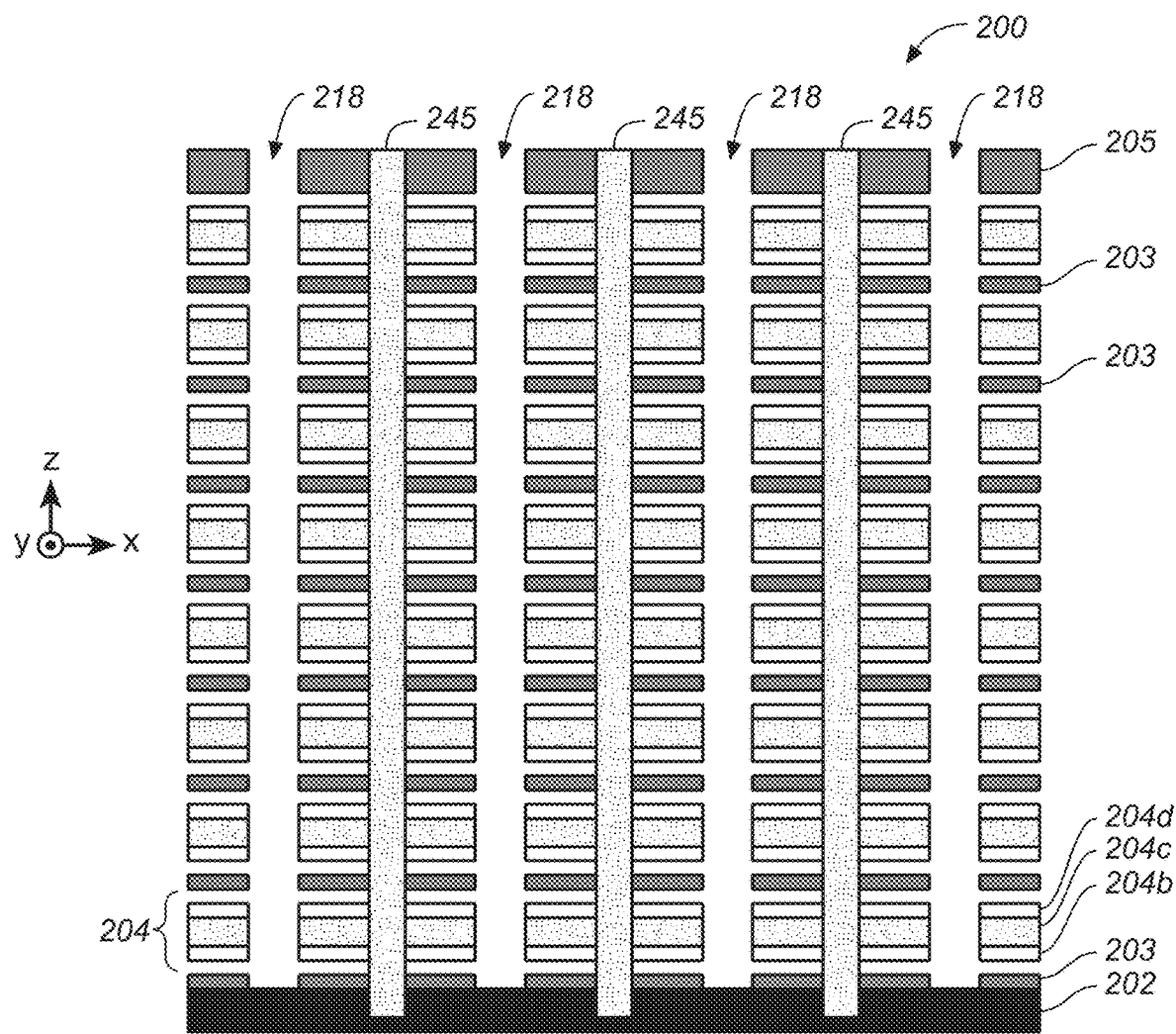
FIG. 2f(ii)

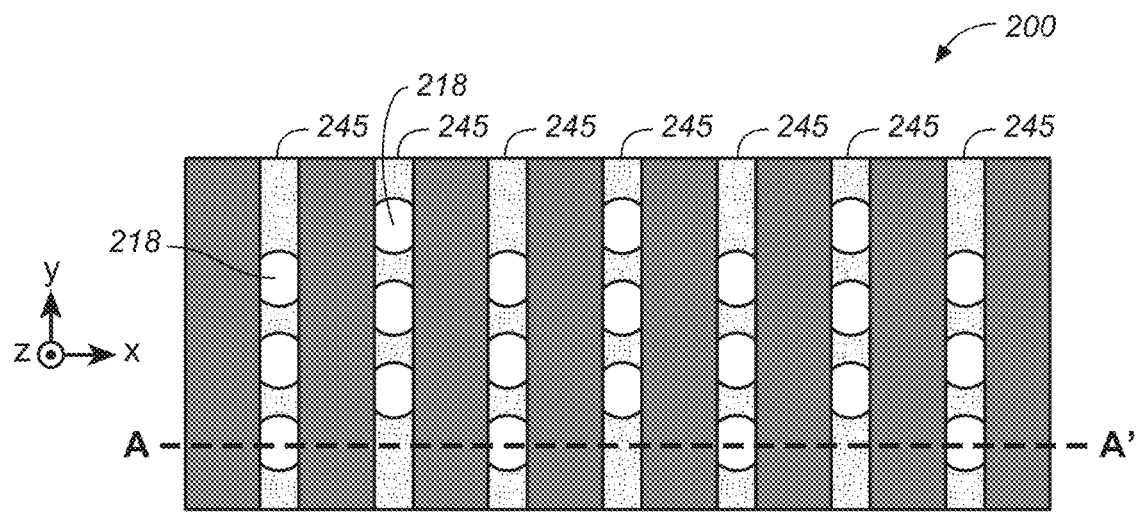
FIG. 2g(i)
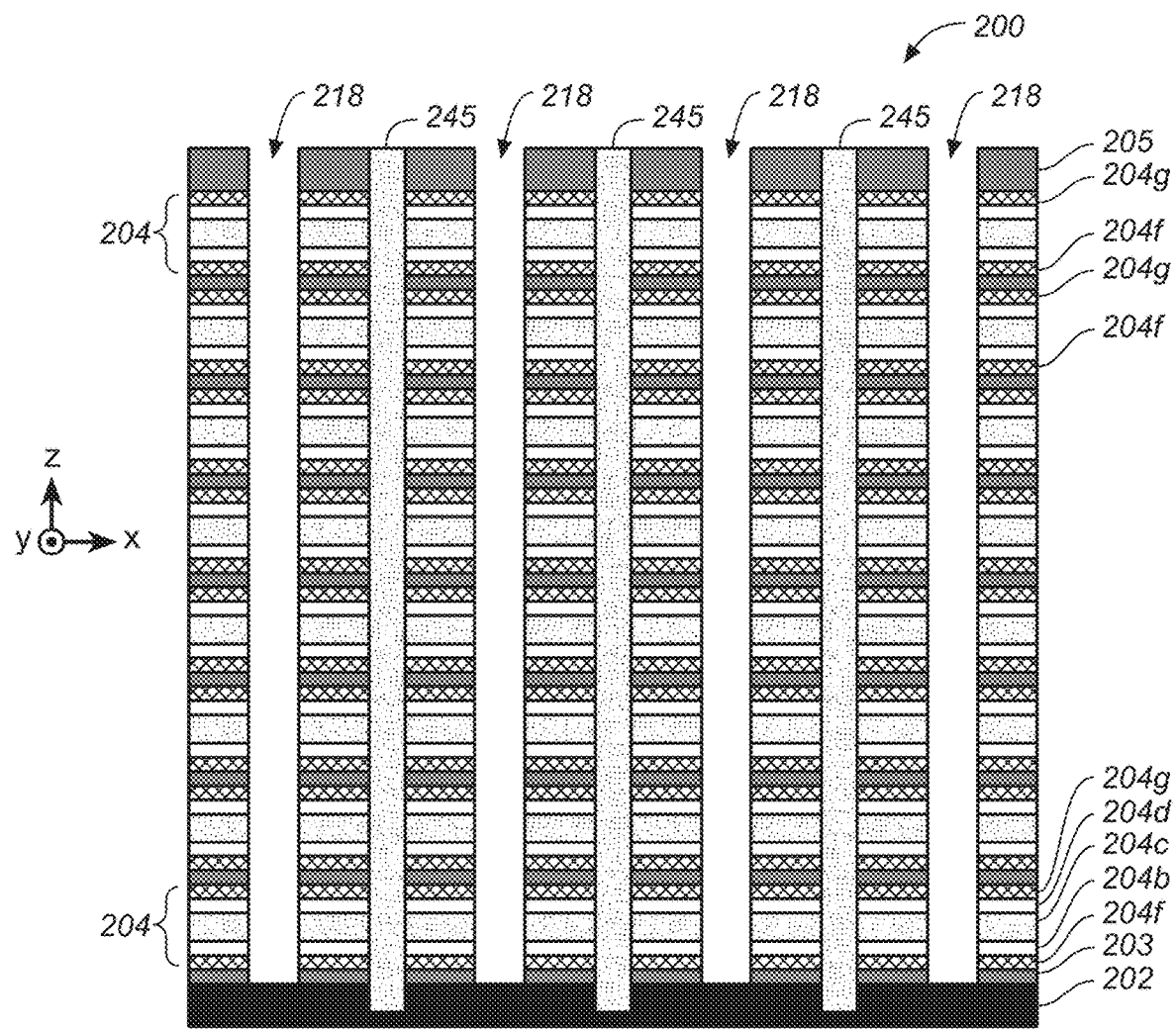
FIG. 2g(ii)

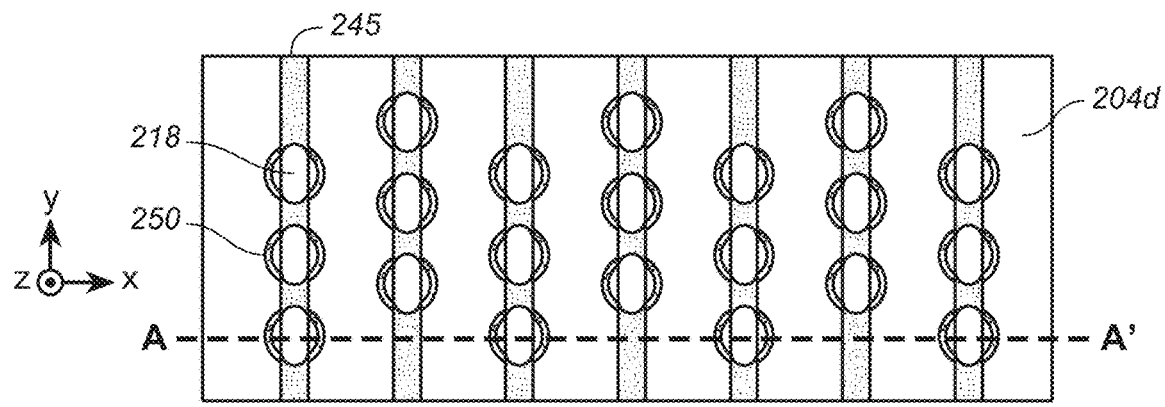
FIG. 2h(i)
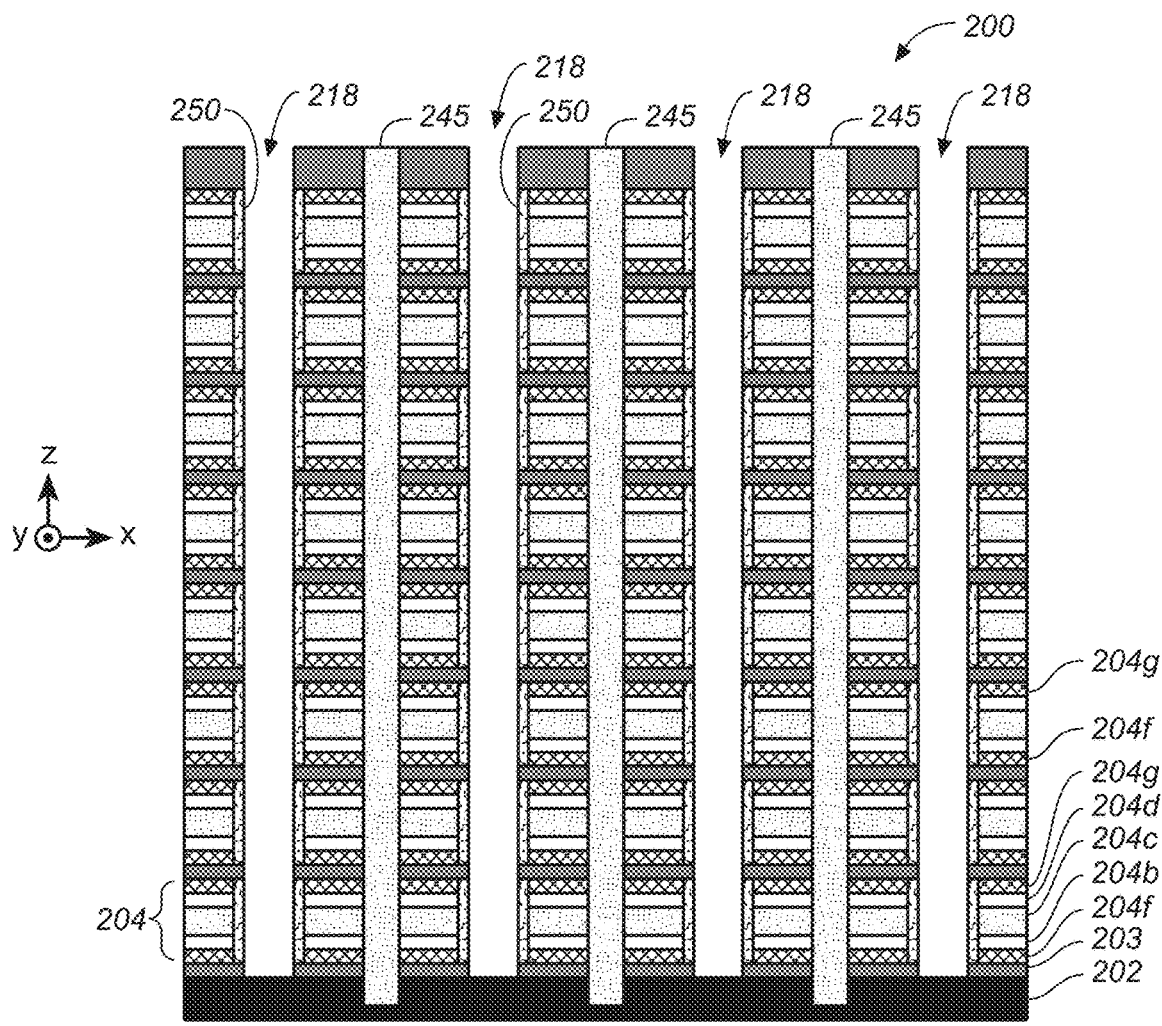
FIG. 2h(ii)

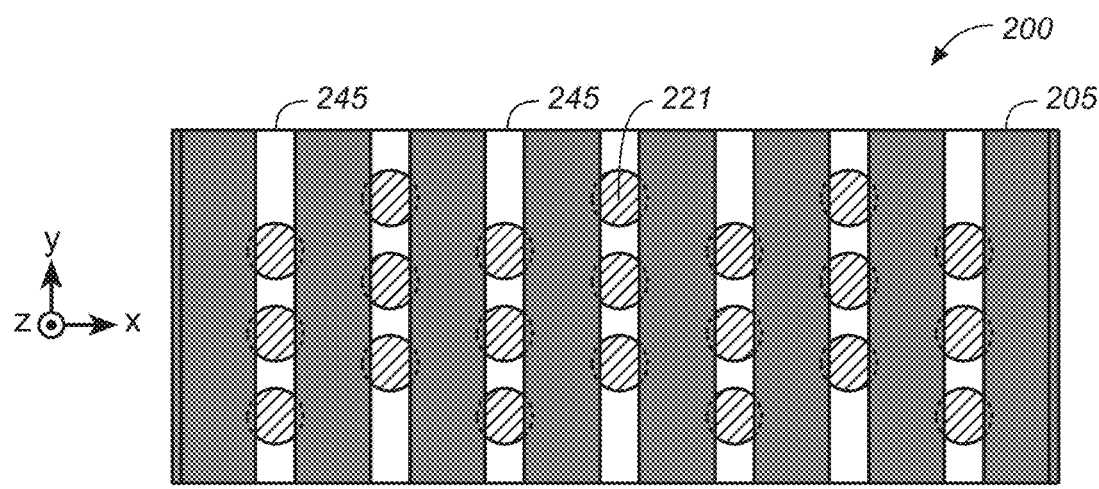
FIG. 3a(i)
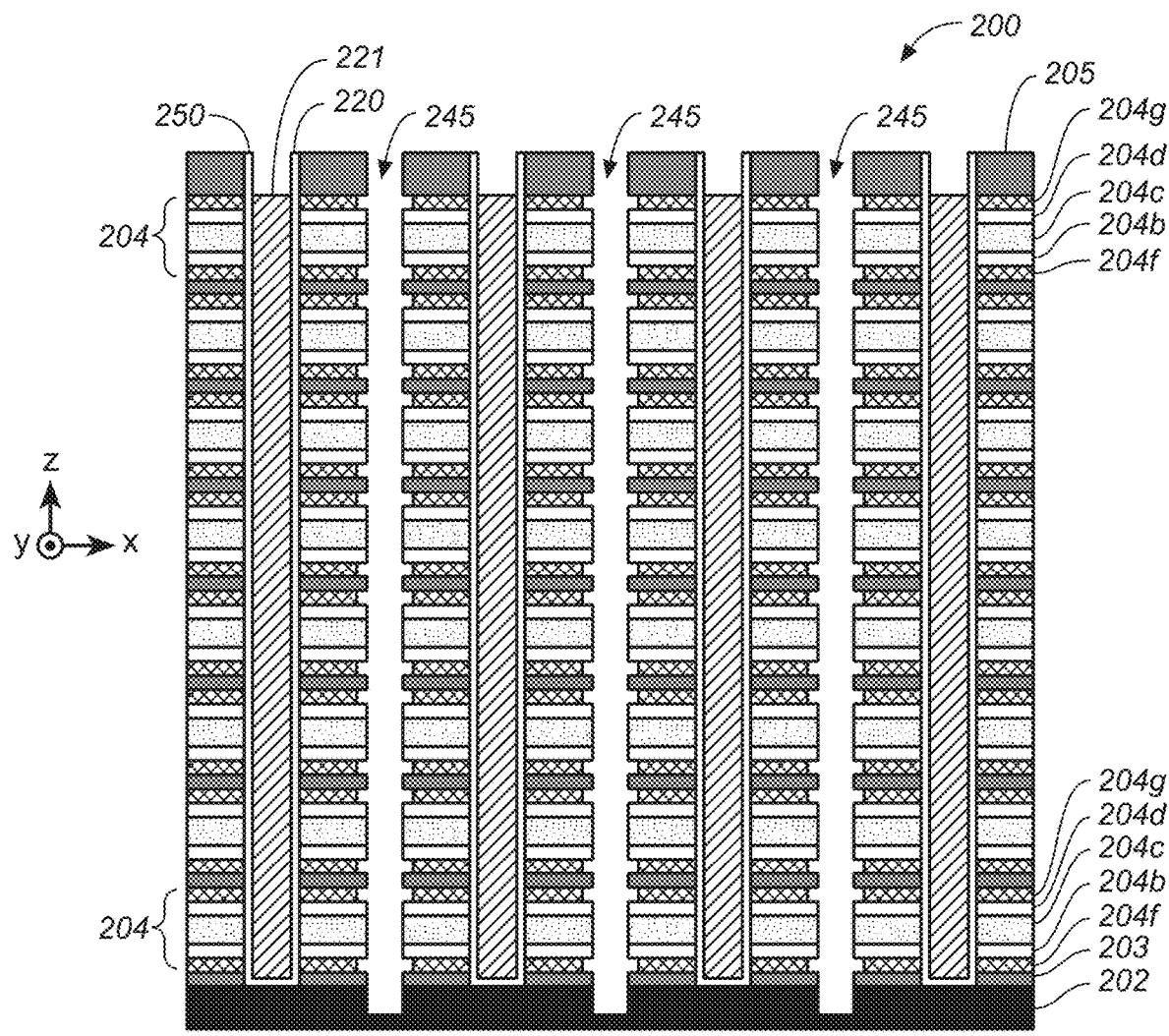
FIG. 3a(ii)

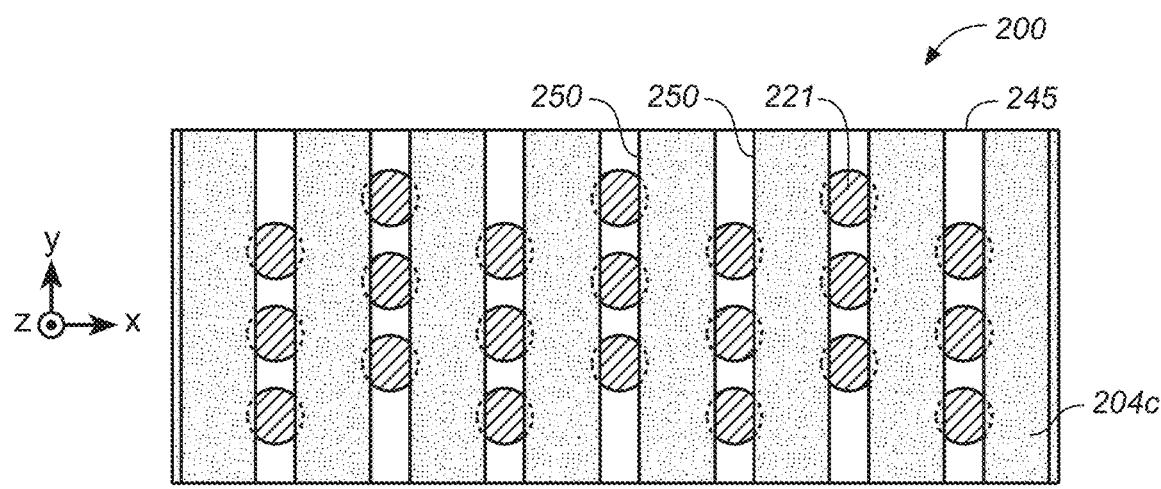
FIG. 3b(i)
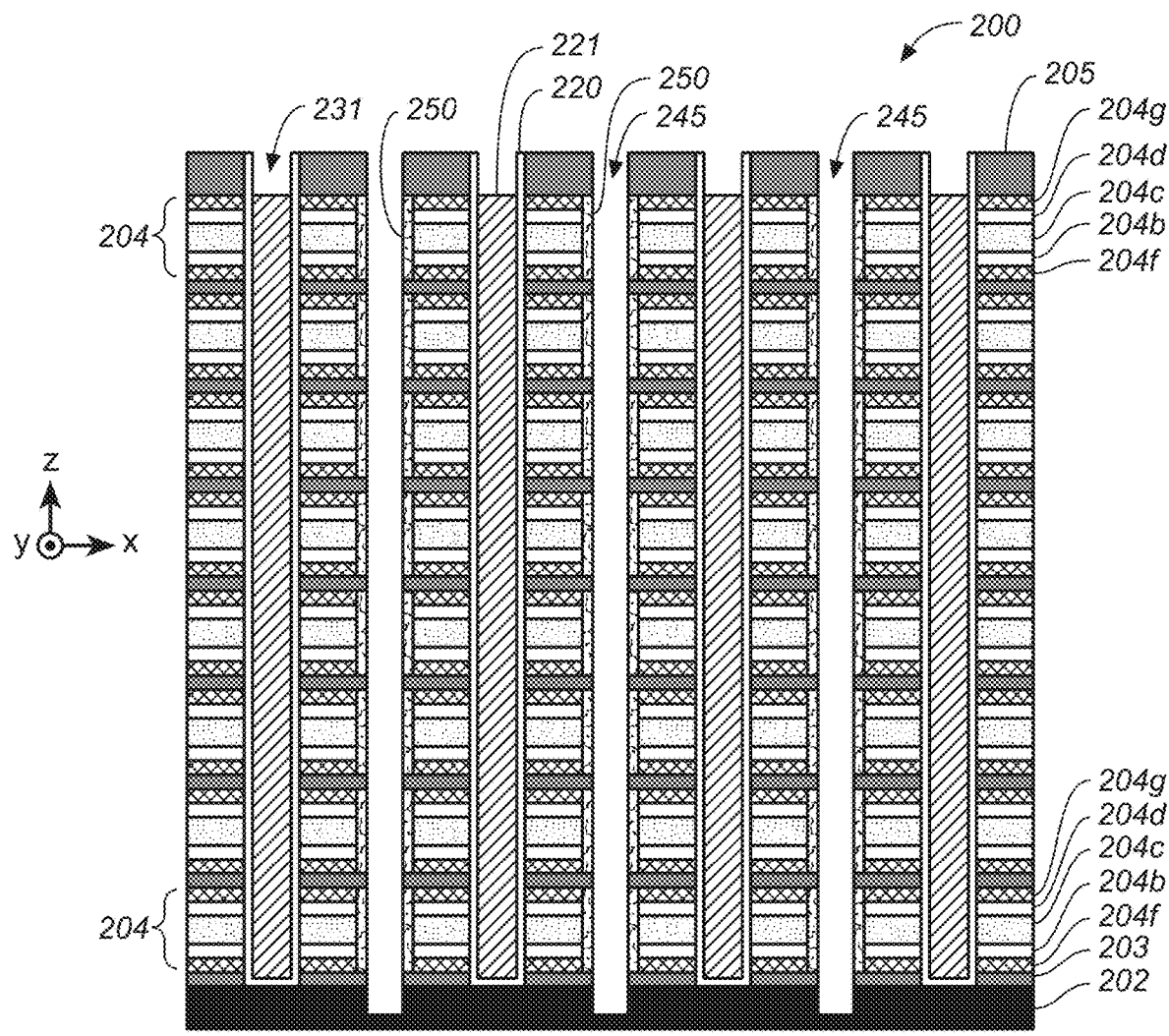
FIG. 3b(ii)

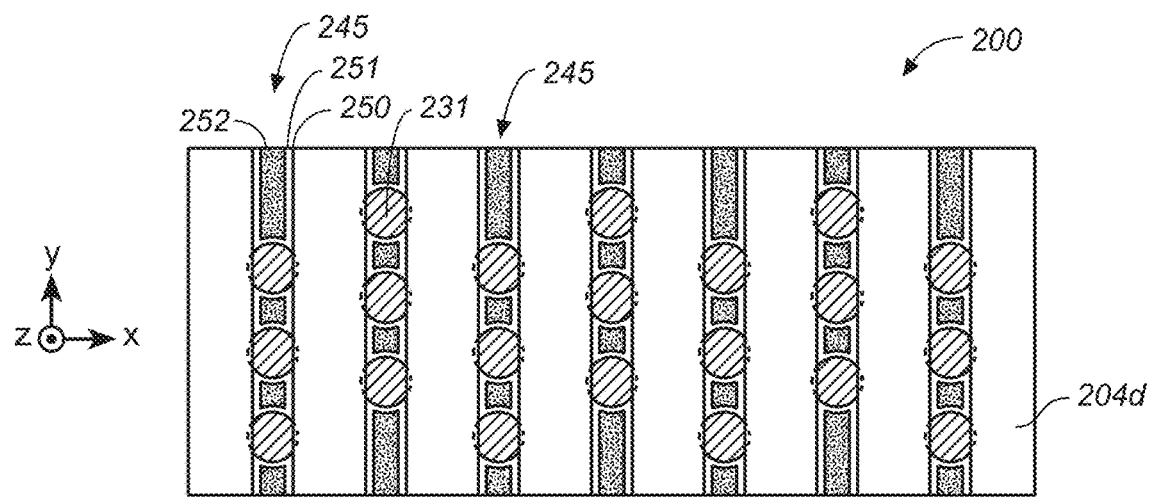
FIG. 3c(i)
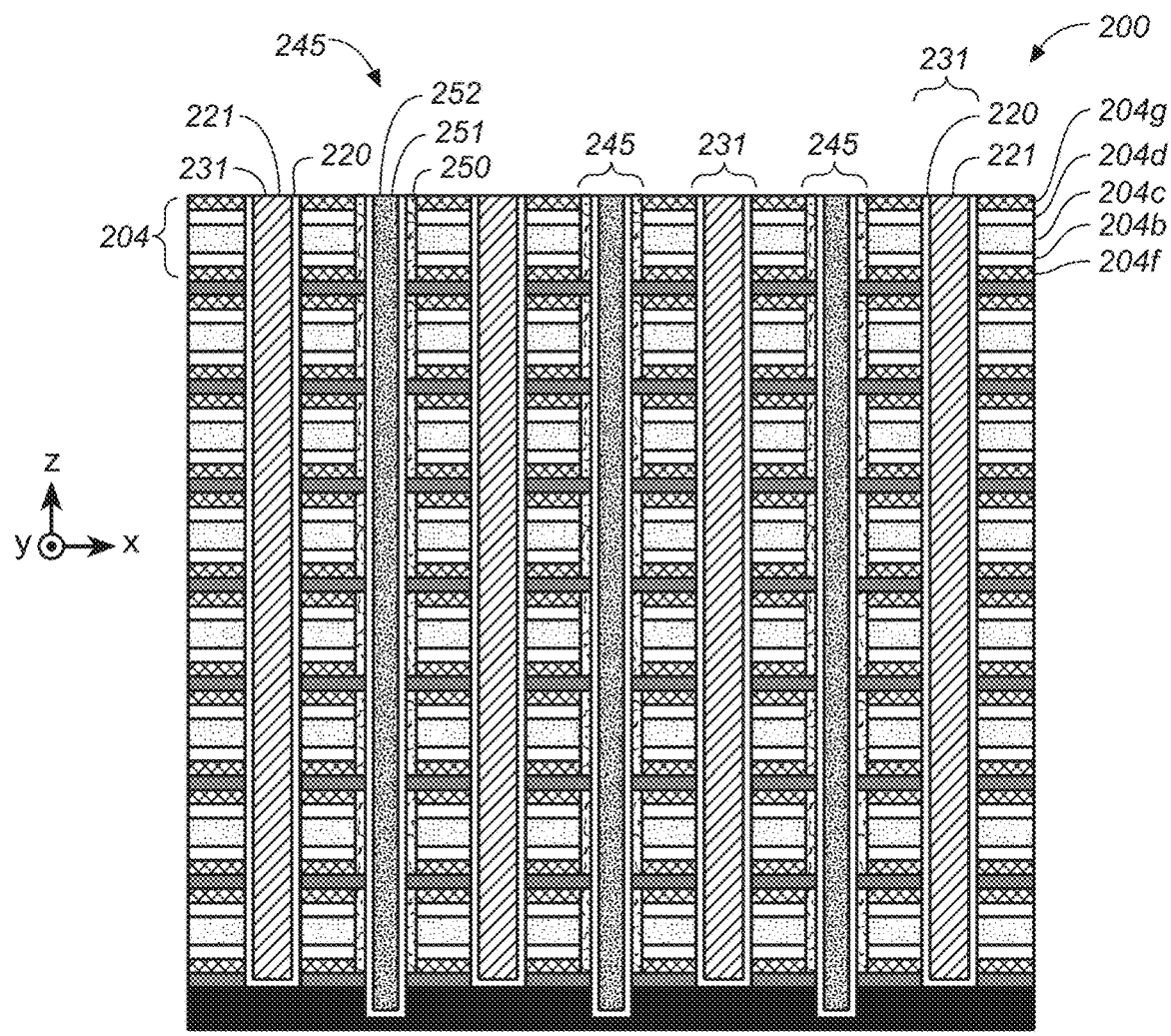
FIG. 3c(ii)

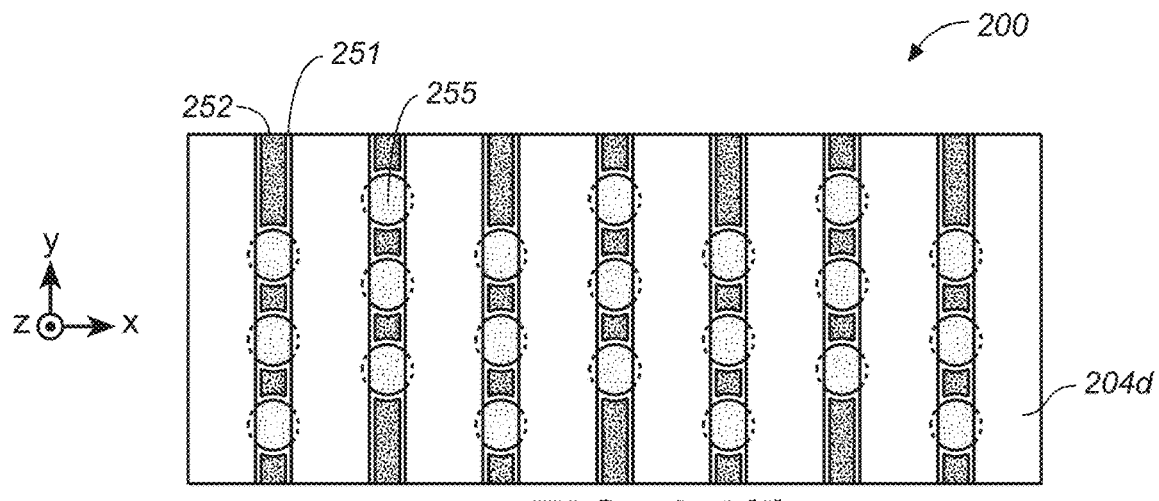
FIG. 3d(i)
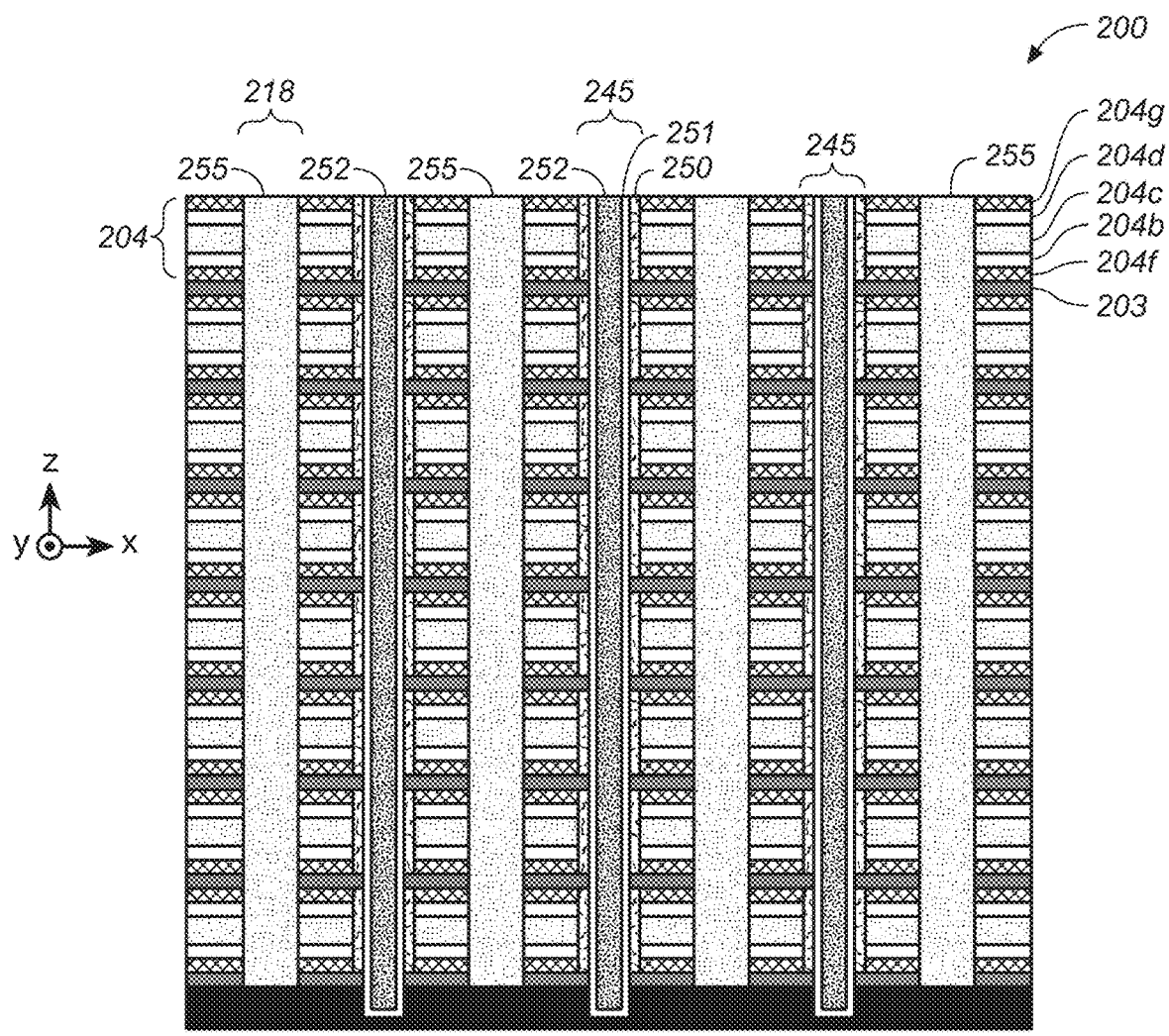
FIG. 3d(ii)

METHODS FOR FABRICATING A 3-DIMENSIONAL MEMORY STRUCTURE OF NOR MEMORY STRINGS

CROSS REFERENCE TO RELATED APPLICATIONS

This present application relates to and claims priority of U.S. provisional patent application ("Related Application I"), Ser. No. 63/054,743, entitled "Methods for Fabricating a 3-Dimensional Memory Structure of NOR Memory Strings," filed on Jul. 21, 2020.

The present application is also related to (i) U.S. patent application ("Related Application II"), Ser. No. 16/510,610, entitled "Fabrication Method For a 3-Dimensional NOR Memory Array," filed on Jul. 12, 2019; and (ii) U.S. provisional patent application ("Related Application III"), Ser. No. 62/950,390, entitled "Process For Preparing A Channel Region Of A Thin-Film Transistor In A 3-Dimensional Thin-Film Transistor Array," filed on Dec. 19, 2019.

The disclosures of Related Applications I, II and III (collectively, the "Related Applications") are hereby incorporated by reference in their entireties.

BACKGROUND OF THE INVENTION

1. Field of the Invention

The present invention relates to processes for manufacturing memory integrated circuits. In particular, the present invention relates to processes for fabricating thin-film storage transistors in a 3-dimensional memory structure formed on a surface of a semiconductor substrate.

2. Discussion of the Related Art

High density memory arrays, e.g., 3-dimensional arrays of NOR memory strings ("3-D NOR memory arrays"), have been disclosed in, for example, U.S. Patent Application Publication 2017/0092371A1 ("Structural Reference I"), entitled "Capacitive-Coupled Non-Volatile Thin-film Transistor Strings in Three-Dimensional Arrays," and U.S. Patent Application Publication 2018/0366489A1 ("Structural Reference II"), entitled "3-Dimensional NOR Memory Array Architecture and Methods for Fabrication Thereof." The disclosures of Structural References I and II (collectively, "Structural References") are hereby incorporated by reference in their entireties. In addition to providing high density and high capacity memory circuits, these 3-D NOR memory arrays may be operated to provide memory circuits at highly desirable speeds that rival conventional memory circuits of much lower circuit densities and significantly higher power dissipation, e.g., as dynamic random-access memories ("DRAMs").

In some examples in the Structural References, a 3-D NOR memory array includes numerous stacks of NOR memory strings, with each stack having numerous NOR memory strings stacked one on top of another. In that context, a NOR memory string includes numerous storage cells that share a common drain region ("common bit line") and a common source region ("common source line"), the storage cells being provided on one or both sides along the length of the NOR memory string. Each storage cell is controlled by a conductor ("word line" or "local word line") that runs substantially orthogonal to the memory string. Each word line may be shared by numerous storage cells in different NOR memory strings along its length.

SUMMARY

According to one embodiment of the present invention, a process for manufacturing a 3-D NOR memory array provides each thin-film storage transistor of a NOR memory string in either a shaft or a portion of a trench between adjacent shafts.

According to that embodiment, the process may include:
(i) providing over a planar surface of a semiconductor substrate a semiconductor structure which may include multiple active multi-layers stacked one on top of another along a first direction that is substantially normal to the planar surface, wherein adjacent active multi-layers are electrically isolated from each other by a layer of an dielectric material (e.g., silicon oxycarbide (SiOC)), and wherein each active multi-layer may include first and second semiconductor layers of a first conductivity type separated by a dielectric material;
(ii) providing multiple shafts arrayed in a regular pattern along both a second direction and a third direction, the second and third directions being substantially orthogonal to each other and each being orthogonal to the first direction, each shaft extending in depth along the first direction through the semiconductor structure and having a predetermined extent along the second direction;
(iii) providing multiple trenches in the semiconductor structure each extending in depth along the first direction and in length along the third direction, each trench (a) intersecting a plurality of the shafts in the second direction, and (b) having a width along the second direction that is less than the extent of each shaft; and
(iv) forming, in either (a) each shaft, or (b) portions of each trench between adjacent shafts: (1) a third semiconductor layer of a second conductivity type opposite the first conductivity type, the third semiconductor layer being formed adjacent to and in contact with the first and second semiconductor layers of each active multi-layer, (2) a charge-trapping layer adjacent the third semiconductor layer; and (3) a conductor layer (in contact with the charge-trapping layer. The conductor layer may include, for example, a metal liner (e.g., titanium nitride) and a filler conductive material (tungsten (W)).

In that embodiment, the first and second semiconductor layers of each active multi-layer, the third semiconductor layer, the charge-trapping layer, and the conductor provide, respectively, a common bit line, a common source line, a channel region, a charge storage layer and a gate electrode of a thin-film storage transistor in a NOR memory string.

When the third semiconductor layer is formed within a shaft, the adjacent trenches are filled by an isolation material. Likewise, when the third semiconductor layer is formed within a trench, the adjacent shafts are filled by the isolation material.

In one embodiment, the active multi-layers may each further include a conductor layer adjacent and in contact with at least one of the first and second semiconductor layers. The conductor layer in each active multi-layer may be formed by replacing a sacrificial layer in each active multi-layer. The conductor layer may be formed using an atomic layer deposition (ALD) conductive material, for example, tungsten.

In one embodiment, the charge-trapping layer comprises a tunneling layer (e.g., silicon oxide), a charge storage layer and a blocking layer (e.g., silicon oxide, aluminum oxide, or both).

In one embodiment, prior to providing the trenches in the semiconductor structure, the shafts are lined the shafts with a dielectric liner (e.g., an oxide liner) and filled with a sacrificial material (e.g., carbon or tungsten).

The present invention is better understood upon consideration of the detailed description below in conjunction with the accompanying drawings.

BRIEF DESCRIPTION OF THE DRAWINGS

FIG. 2a(ii) illustrates successive recessing and etching steps to create staircase portion 102a or 102b of FIG. 1, in accordance with one embodiment of the present invention.

FIG. 2b(i) is a top view of array portion 101 of memory structure 200;

FIG. 2b(ii) shows an X-Z plane cross-section of memory structure 200 along line A-A' in FIG. 2b(i), after etching steps creates shafts 218 down to etch stop layer 202, in accordance with one embodiment the present invention.

FIGS. 2c(i) and 2c(ii) show, respectively, a top view and a cross section view (in an X-Z plane along line A-A' of FIG. 2c(i)) of resulting memory structure 200, after hard mask 225 is patterned, according to one embodiment of the present invention.

FIGS. 2d(i) and 2d(ii) show, respectively, a top view and a cross section view (in an X-Z plane along line A-A' of FIG. 2d(i))) of resulting memory structure 200, after hard mask 225 has been removed, according to one embodiment of the present invention.

FIGS. 2e(i) and 2e(ii) show, respectively, a top view and a cross section view (in an X-Z plane along line A-A' of FIG. 2e(i))) of resulting memory structure 200, after pillars 231 have been removed, according to one embodiment of the present invention.

FIGS. 2f(i) and 2f(ii) show, respectively, a top view and a cross section view (in an X-Z plane along line A-A' of FIG. 2f(i))) of resulting memory structure 200, after removal of SiN layers 204a and 204e from each active multi-layer exposed along the side walls of shaft 218, according to one embodiment of the present invention.

FIGS. 2g(i) and 2g(ii) show, respectively, a top view and a cross section view (in an X-Z plane along line A-A' of FIG. 2g(i)) of resulting memory structure 200, after replacing SiN layers 204a and 204e of each active multi-layer by conductor layers 204f and 204g, according to one embodiment of the present invention.

FIGS. 2h(i) and 2h(ii) show, respectively, a top view and a cross section view (in an X-Z plane along line A-A' of FIG. 2g(i)) of resulting memory structure 200, after recessing channel polysilicon layer 250, according to one embodiment of the present invention.

FIGS. 3a(i) and 3a(ii) show, respectively, a top view and a cross section view (in an X-Z plane along line A-A' of FIG. 3a(i)) of resulting memory structure 200, after conductor layers 204f and 204g are recessed, according to an alternative embodiment of the present invention.

FIGS. 3b(i) and 3b(ii) show a top view and a cross section view (in an X-Z plane along line A-A' of FIG. 3b(i)) of resulting memory structure 200, after channel polysilicon layer 250 is deposited, according to an alternative embodiment of the present invention.

FIGS. 3c(i) and 3c(ii) show a top view and a cross section view (in an X-Z plane along line A-A' of FIG. 3c(i)) of resulting memory structure 200, after conductive material 252 is deposited and planarized, according to an alternative embodiment of the present invention.

FIGS. 3d(i) and 3d(ii) show, respectively, a top view and a cross section view in an X-Z plane along line A-A' of FIG. 3d(i)) of resulting memory structure 200, after isolation material 255 is deposited and planarized, according to an alternative embodiment of the present invention.

DETAILED DESCRIPTION OF THE PREFERRED EMBODIMENTS

Figure 1:
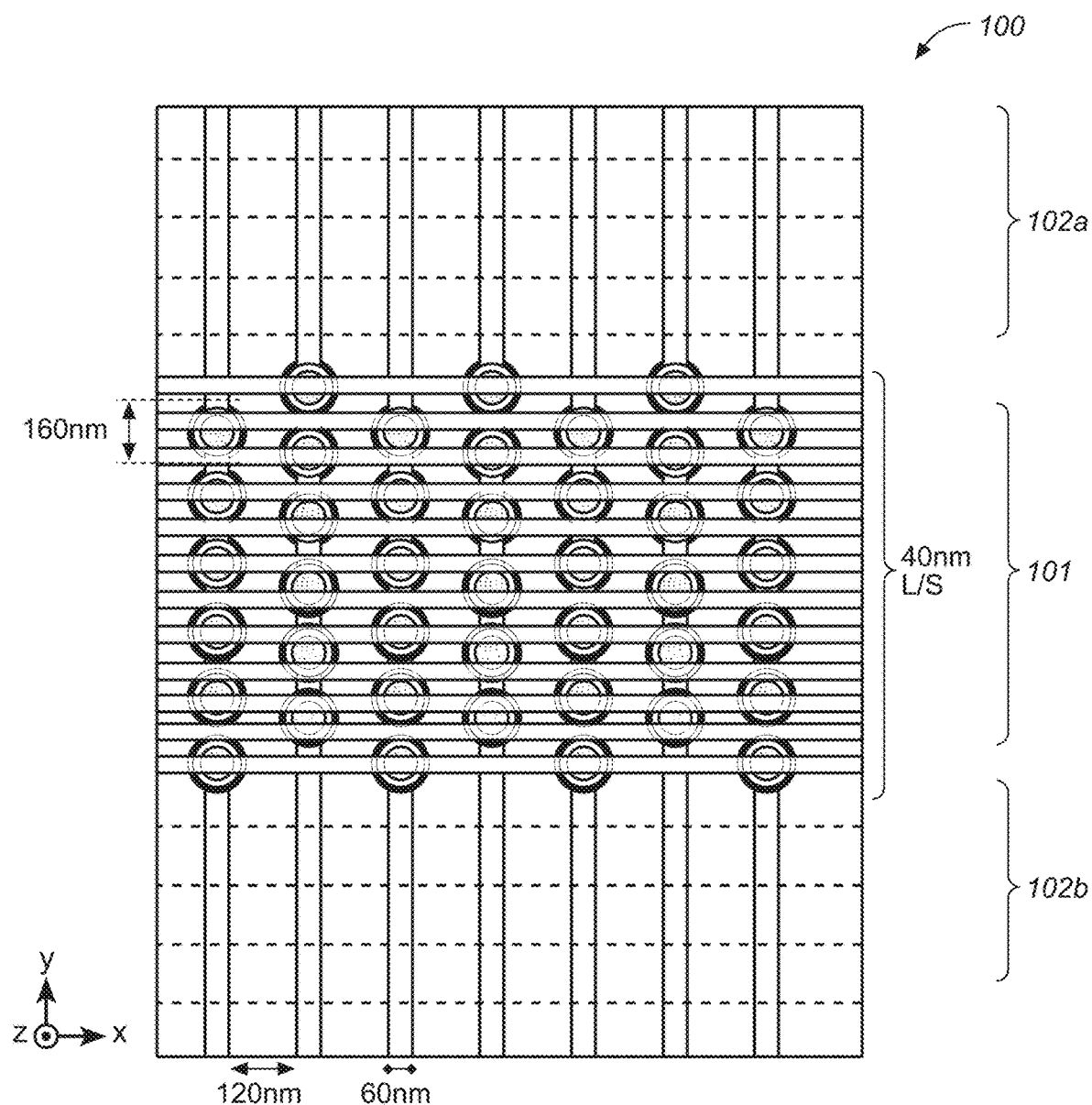
FIG. 1 is a schematic top view of modular unit ("tile") 100 in a memory structure that includes 3-D NOR memory arrays, in accordance with one embodiment of the present invention.

FIG. 1 is a schematic top view of modular unit ("tile") 100 in a memory structure that includes 3-D NOR memory arrays, in accordance with one embodiment of the present invention. Tile 100 is typically formed on a planar surface for a semiconductor substrate, such as a monocrystalline epitaxial layer of a silicon wafer. In this detailed description, to facilitate visualization of the 3-dimensional structures, a rectilinear coordinate reference frame is used, which postulates the planar surface on an X-Y plane, and a normal of the planar surface in the Z-direction orthogonal to the X-Y plane.

In some examples, the semiconductor substrate may include support circuitry for the 3-D NOR memory arrays formed therein or thereon underneath the 3-D NOR memory arrays. Such support circuits may include both analog and digital circuits. Some examples of such support circuits include shift registers, latches, sense amplifiers, reference cells, power supply lines, bias and reference voltage generators, inverters, NAND, NOR, Exclusive-Or and other logic gates, input/output drivers, address decoders (e.g., bit line and word line decoders), other memory elements, data encoding and decoding circuits including, for example, error detection and correction circuits), sequencers and state machines. This detailed description begins with a semiconductor substrate in which such support circuits, if any, have already been formed in a conventional manner. This detailed description and the skill of those of ordinary skill in the art inform any constraints or relevant design options imposed or made available by the process or processes carried out in the formation of the support circuit of the semiconductor substrate on the various embodiments of the present invention.

As shown in FIG. 1, tile 100 includes "array" portion 101, which is provided between "staircase portions" 102a and 102b. The thin-film storage transistors of the NOR memory strings in tile 100 are formed in array portion 101, and staircase portions 102a and 102b allow connections through conductive vias to the common bit lines and, optionally, the common source lines also, of the NOR memory strings. (The Structural References disclose a scheme in which the common source lines are pre-charged to serve as virtual voltage reference source during programming, reading and erase operations, thereby obviating the need for a continuous electrical connection with the support circuitry during such operations.) In FIG. 1, array portion 101 and staircase portions 102a and 102b are not drawn to scale. For example, array portion 101 may be much larger in area than either of staircase portions 102a and 102b.

Figure 2A:
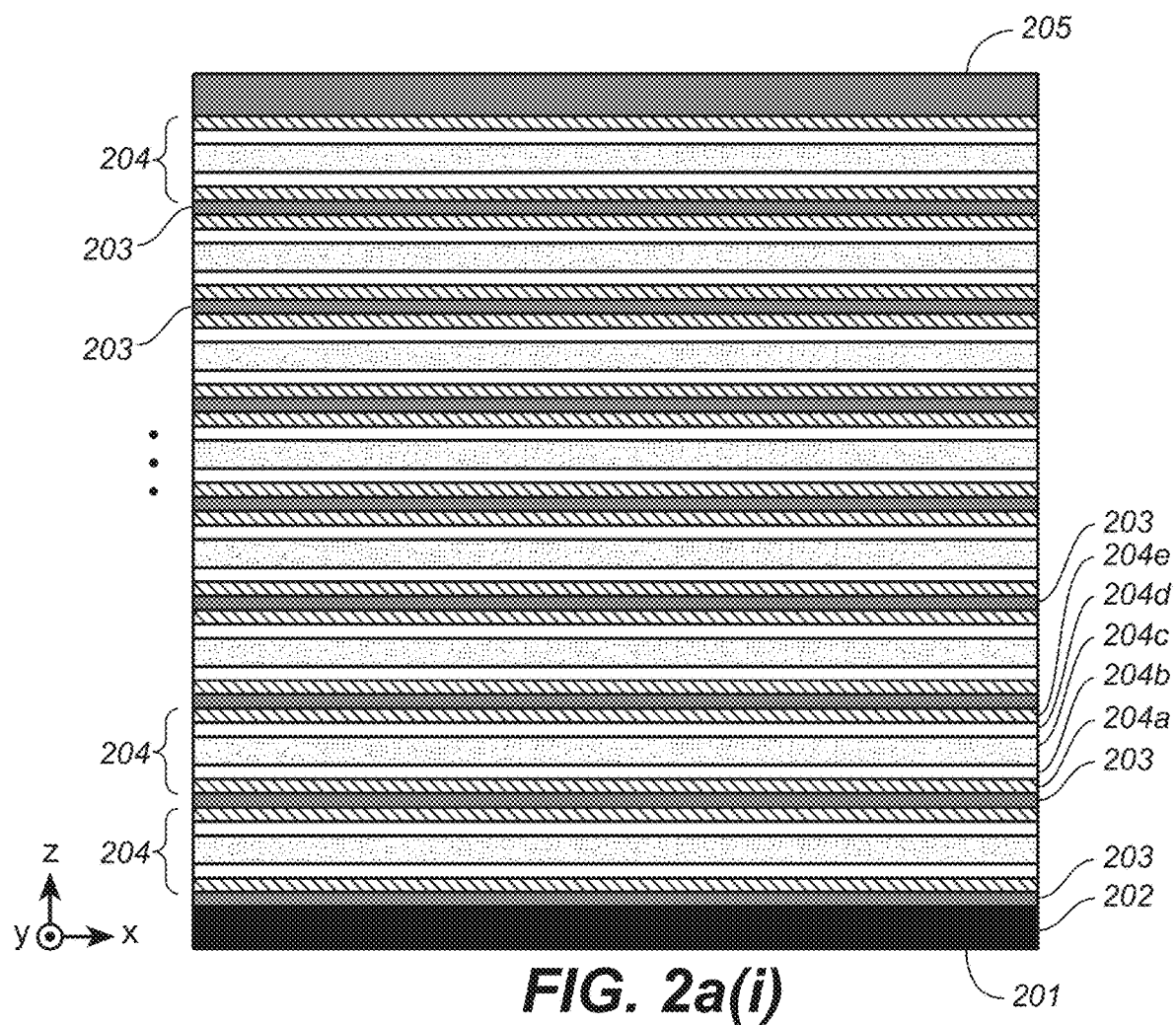
FIG. 2a(i) shows a cross section in the Z-X plane of memory structure 200 after depositions of numerous material layers (discussed below), in accordance with one embodiment of the present invention.

FIG. 2a(i) shows a cross section in the Z-X plane of memory structure 200 after depositions of numerous material layers (discussed below), in accordance with one embodiment of the present invention. Initially, a pad oxide 201 (e.g., a silicon oxide) is provided over the planar surface of the semiconductor substrate. Etch stop layer 202 (e.g., tungsten (W), tungsten nitride (WN), aluminum oxide (AlO) or aluminum nitride (AlN)) is then provided. Silicon oxycarbide (SiOC) layer 203 is then provided to isolate etch stop layer 202 from the next layer to be deposited. Thereafter, active multi-layers 204 (eight in total, as shown in FIG. 2a(i)) are successively deposited. Active multi-layers 204 each include, in order of deposition, (i) silicon nitride (SiN) layer 204a, (ii) $N^+$-doped amorphous silicon (or polysilicon) layer 204b, (iii) sacrificial oxide layer 204c, (iv) $N^+$-doped amorphous silicon (or polysilicon) layer 204d, and (v) SiN layer 204e. Between adjacent active multi-layers is deposited a SiOC layer, indicated in FIG. 2a(i) as SiOC layer 203. Isolation SiOC layer 205 is then deposited on top of multi-layers 204. The resulting structure is memory structure 200 of FIG. 2.

FIG. 2a(ii) illustrates successive recessing and etching steps to create staircase portion 102a or 102b of FIG. 1, in accordance with one embodiment of the present invention. As shown in FIG. 2a(ii), the surface of memory structure 200 is patterned to form mask layer 210, exposing a first portion of memory structure 211, as shown in FIG. 2a(i)(1). The exposed portion of isolation SiOC layer 205 is then removed to expose a portion of active multi-layer 204 underneath. That exposed portion of active multi-layer 204 is then removed, exposing a portion of SiOC layer 203 underneath. The resulting structure is shown in FIG. 2a(ii)(2). Mask layer 210 is then recessed to expose a new portion of isolation SiOC layer 205. Removal of the exposed SiOC layers 205 and 203, removal of active multi-layer 204 and recessing mask layer 210 is then repeated 7 more times, thereby forming staircase structure 102a or 102b. Thereafter, an oxide is deposited to fill the portions of active layers 240 removed. A chemical-mechanical polishing (CMP) step is carried out to remove mask layer 210 and to planarize the top surface of memory structure 200.

This description describes formation of staircase structures 102a and 102b prior to describing in detail the processing of array portion 101. However, array portion 101 may also be processed prior to formation of staircase structures 102a and 102b.

Hard mask layer 215 (e.g., a carbon hard mask) is then deposited and photo-lithographically patterned over memory structure 200. FIG. 2b(i) is a top view of array portion 101 of memory structure 200, showing hard mask 215 patterned to provide numerous openings 217 to expose corresponding portions of memory structure 200. In FIG. 2b(i), openings 217 are shown to be circular; however, any suitable shape (e.g., oval) may be used. A series of etching steps remove the exposed portions of isolation layers 205 and 203, and active multi-layers 204 until etch stop layer 202 is reached, thereby forming shafts 218. FIG. 2b(ii) shows an X-Z plane cross-section of memory structure 200 along line A-A' in FIG. 2b(i), after the etching steps, in accordance with one embodiment the present invention. (In this description, a "column" of objects denotes objects aligned along the Y-direction, whereas a "row" of objects denotes objects aligned along the X-direction.) In FIG. 2b(i), adjacent columns of opening 217 are staggered relative to each other, such that the closest openings in adjacent columns have a greater separation between them than if such openings are aligned in the X-direction. In one embodiment adjacent columns of openings 217 are 160 nm apart along the X-direction, and each of openings 217 may have a diameter of 100 nm. Shafts 218 may be up to 2 microns deep, so that the etching steps has an aspect ratio that is less than 20.

Shafts 218 may be lined using an oxide liner 220 and filled using sacrificial material 221 (e.g., carbon or tungsten (W) with an adhesive layer of titanium nitride (TiN)). The surface of memory structure 200 may then planarized using CMP or, when carbon is used as the sacrificial material, etched back. Subsequent to filling shafts 218 with sacrificial material 221, hard mask 225 is deposited and patterned to form rectilinear openings 240 that expose portions of memory structure 200 (e.g., each 60 nm wide, in one embodiment) overlapping the columns of filled shaft 218 (i.e., along the Y-direction. A top view and a cross section view (in an X-Z plane along line A-A' of FIG. 2c(i)) of resulting memory structure 200, after hard mask 225 is patterned, are shown in FIGS. 2c(i) and 2c(ii), respectively, according to one embodiment of the present invention.

A series of successive etches remove the portions of SiOC layers 205, active multi-layers 204, and etch stop layer 202 that are successively exposed underneath rectilinear portions 240 of hard mask 225, dividing memory structure 200 into numerous stacks separated by trenches 245. As the etches are designed to be selective to oxide line 220 and sacrificial material 221 in filled shaft 218, filled shaft 218 becomes pillars 231 of sacrificial material 221, surrounded on its cylindrical surface by oxide liner layer 220. An additional wet etch may be provided to remove any stringers of the various material. Hard mask 225 may then be removed (e.g., by CMP or by ashing, as appropriate). A top view and a cross section view (in an X-Z plane along line A-A' of FIG. 2d(i)) of resulting memory structure 200, after hard mask 225 has been removed, are shown in FIGS. 2d(i) and 2d(ii), respectively, according to one embodiment of the present invention.

Trenches 245 may then be filled by a silicon oxide, e.g., using atomic layer deposition (ALD) or a spin-on technique. Excess oxide on the top surface of memory structure 200 may then be removed using, for example, CMP. Thereafter, pillars 231 are removed using, for example, a suitable wet etch. A top view and a cross section view (in an X-Z plane along line A-A' of FIG. 2e(i)) of resulting memory structure 200, after removal of pillars 231, are shown in FIGS. 2e(i) and 2e(ii), respectively, according to one embodiment of the present invention.

Removal of pillars 231 restores shafts 218 in the silicon oxide filler of trenches 245 and exposes active multi-layers 204. Through shafts 218, SiN layers 204a and 204e of each of active multi-layers 204 may be removed using, for example, a silicon nitride wet etch. A top view and a cross section view in an X-Z plane (along line A-A' of FIG. 2f(i)) of resulting memory structure 200, after removal of SiN layers 204a and 204e from each of active multi-layers 204, are shown in FIGS. 2f(i) and 2f(ii), respectively, according to one embodiment of the present invention.

An ALD step deposits a conductor material into the cavities resulting from removal of SiN layers 204a and 204e in each of active multi-layers 204. The conductive material may include, for example, a metal liner (e.g., titanium (Ti), titanium nitride (TiN), tantalum (Ta) or tantalum nitride (TaN)), followed by a refractory metal (e.g., tungsten (W), tungsten nitride (WN) or molybdenum (Mo)). Thereafter, an anisotropic separation etch removes the conductor material from shafts 218. Conductor layers 204f and 204g that respectively replace SiN layers 204a and 204e in each active multi-layer may be recessed by, for example, 10 nm. A top view and a cross section view in an X-Z plane (along line A-A' of FIG. 2g(i)) of resulting memory structure 200, after replacement of SiN layers 204a and 204e from each of active multi-layers 204 by conductor layers 204f and 204g, are shown in FIGS. 2g(i) and 2g(ii), respectively, according to one embodiment of the present invention. Conductor layers 204f and 204g are optional conductor layers that are formed adjacent and in contact with $N^+$ amorphous silicon layers 204b and 204d. $N^+$ amorphous silicon layers 204b and 204d of each active multi-layer 204 would become the common bit line and the common source line of a NOR memory string to be formed. Conductor layers 204f and 204g reduce the resistivities in the common bit line and the common source line.

Then, sacrificial oxide layer 204c, $N^+$ amorphous silicon layer 204b, and $N^+$ amorphous silicon layer 204d of each active multi-layer 204 may be recessed to create a cavity for deposition of the channel material for the thin-film storage transistors. Polysilicon layer 250, intended for forming the channel regions of the thin-film storage transistors, is then deposited, etched back for separation, and recessed to remove stringers. A top view and a cross section view (in an X-Z plane along line A-A' of FIG. 2h(i)) of resulting memory structure 200, after channel polysilicon layer 250 is recessed, are shown in FIGS. 2h(i) and 2h(ii), respectively, according to one embodiment of the present invention.

Figure 2I:
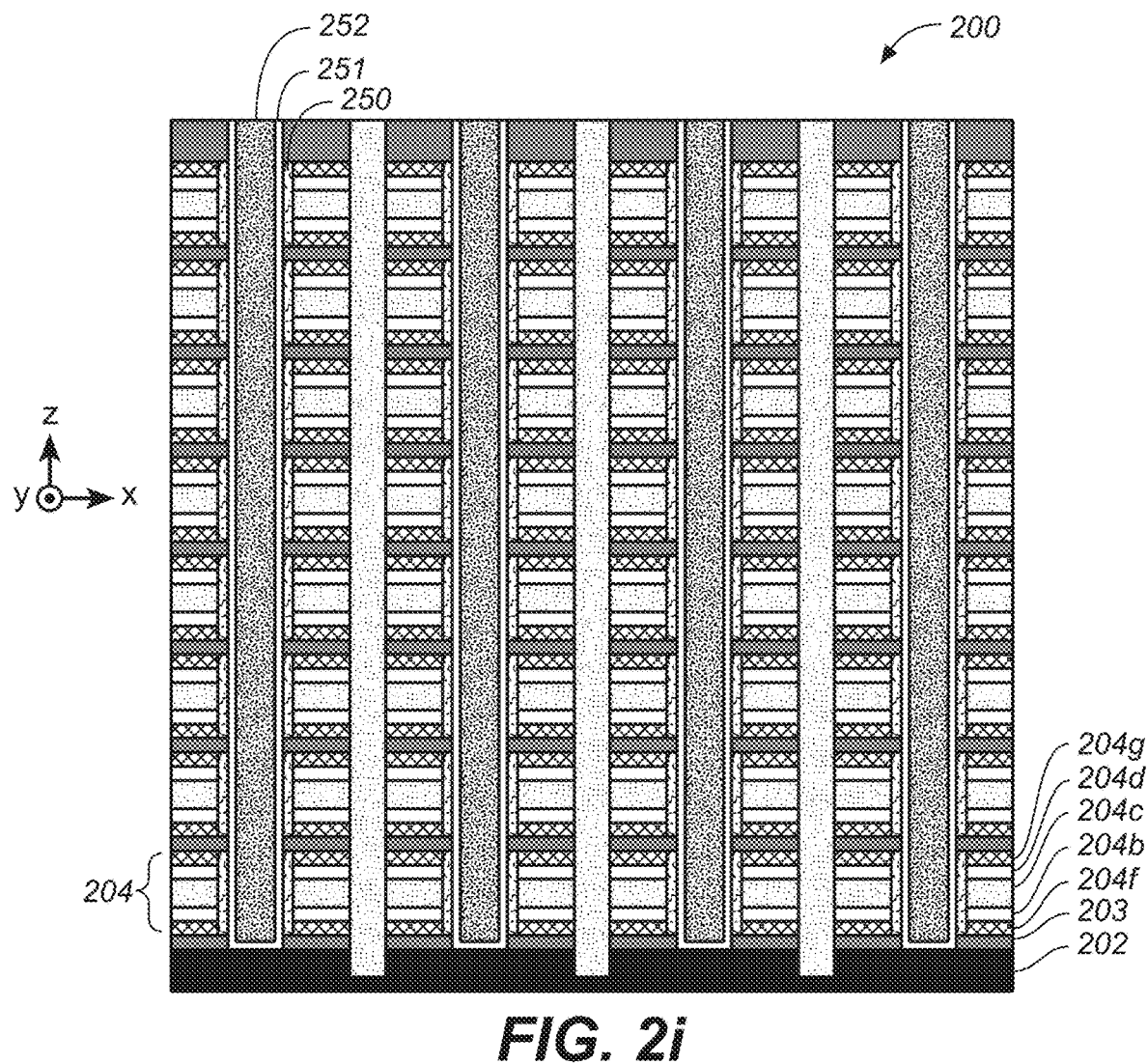
FIG. 2i shows a cross section view in an X-Z plane of resulting memory structure 200, after deposition of conductive material 252, according to one embodiment of the present invention.

Charge-trapping layer 251 is then conformally deposited on the sidewalls of shafts 218. Charge-trapping layer 251 may be a multi-layer that includes a tunnel dielectric layer (e.g., silicon oxide), a storage layer (e.g., silicon nitride), and a blocking dielectric layer (e.g., silicon oxide, aluminum oxide, or both). Shafts 218 can then be filled by conductive material 252 (e.g., tungsten, with an TiN adhesion layer), which forms a gate electrode ("word line") for a storage cell in each active multi-layer 240 along the gate electrode's length. A cross section view in an X-Z plane of resulting memory structure 200, after conductive material 252 is deposited, is shown in FIG. 2i, according to one embodiment of the present invention.

In the process illustrated in FIGS. 2a-2i, each thin-film storage transistor is formed within one of shafts 218, which houses a curved channel region, charge storage layer 251 and a gate electrode formed out of conductive material 252. In such an embodiment, the rectilinear portions of trenches 245 provide isolation between the thin-film storage transistors. Alternatively, the thin-film storage transistor may be formed within the rectilinear portions of trenches 245, with isolation material filling shafts 218 to provide isolation between the thin-film storage transistors. A process of such an alternative is next described.

According to an alternative embodiment of the present invention, subsequent to removal of hard mask 225, as shown in FIGS. 2e(i) and 2e(ii), replacement of SiN layers 204a and 204e by conductor layers 204f and 204g, respectively is carried out substantially as described above in conjunction with FIGS. 2e-2g, except that removal of SiN layers 204a and 204 begins from the rectilinear portion of trenches 245, rather than through shafts 218, as oxide liner 220 and sacrificial material 221 have not been removed. Conductor layers 204f and 204g that respectively replace SiN layers 204a and 204e in each active multi-layer may be recessed by, for example, 10 nm. A top view and a cross section view in an X-Z plane (along line A-A' of FIG. 3a(i)) of resulting memory structure 200, after conductor layers 204f and 204g are recessed, are shown in FIGS. 3a(i) and 3a(ii), respectively, according to an alternative embodiment of the present invention.

Thereafter, sacrificial oxide layer 204c, $N^+$ amorphous silicon layer 204b, and $N^+$ amorphous silicon layer 204d of each active multi-layer 204 may be recessed to create a cavity for deposition of the channel material for the thin-film storage transistors. Polysilicon layer 250, intended for forming the channel regions of the thin-film storage transistors, is then deposited, etched back for separation, and recessed to remove stringers. A top view and a cross section view in an X-Z plane (along line A-A' of FIG. 3b(i)) of resulting memory structure 200, after channel polysilicon layer 250 is recessed, are shown in FIGS. 3b(i) and 3b(ii), respectively, according to an alternative embodiment of the present invention.

Charge-trapping layer 251 is then conformally deposited on the sidewalls of trenches 245. Charge-trapping layer 251 may be a multi-layer that includes:

(i) a tunneling layer (e.g., any silicon oxide ($SiO_x$), silicon nitride (SiN), silicon oxynitride (SiON), any aluminum oxide ($AlO_x$), any hafnium oxide ($HfO_x$), zirconium oxide ($ZrO_x$), any hafnium silicon oxide ($HfSi_xO_y$), any hafnium zirconium oxide (HfZrO), or any combination thereof);

(ii) a charge storage layer (e.g., silicon nitride (SiN), hafnium oxide ($HfO_2$), or hafnium silicon oxynitride (HfSiON)) and (iii) a blocking layer (e.g., any silicon oxide ($SiO_x$), any aluminum oxide ($AlO_x$), or both).

Trenches 245 can then be filled by conductive material 252 (e.g., tungsten, with an TiN adhesion layer), which forms a gate electrode ("word line") for a storage cell in each active multi-layer 240 along the gate electrode's length. Excess conductive material on the top surface of memory structure 200 may be removed by CMP. A top view and a cross section view in an X-Z plane (along line A-A' of FIG. 3c(i)) of resulting memory structure 200, respectively, after conductive material 252 is deposited and planarized, are shown in FIGS. 3c(i) and 3c(ii), according to one embodiment of the present invention.

Thereafter, pillars 231 in shafts 218 are removed using, for example, a suitable wet etch. Removal of pillars 231 restores shafts 218 in conductor material 252 of trenches 245. Shafts 218 may then be filled by suitable isolation material 255 (e.g., silicon oxide). Excess isolation material on top of memory structure 200 may then be removed by CMP. A top view and a cross section view in an X-Z plane (along line A-A' of FIG. 3d(i)) of resulting memory structure 200, after deposition of isolation material 255, are shown in FIGS. 3d(i) and 3d(ii), respectively, according to one embodiment of the present invention.

The above detailed description is provided to illustrate specific embodiments of the present invention and is not intended to be limiting. Numerous variations and modifications within the scope of the present invention are possible. The present invention is set forth in the accompanying claims.

We claim:

1. A process, comprising:
   providing over a planar surface of a semiconductor substrate a semiconductor structure which comprises a plurality of active multi-layers which are stacked one on top of another along a first direction that is substantially normal to the planar surface, wherein adjacent active multi-layers are electrically isolated from each other by a dielectric layer, and wherein each active multi-layer comprises first and second conductive layers separated by a dielectric material;

providing a plurality of shafts arrayed in a regular pattern along both a second direction and a third direction, the second and third directions being substantially orthogonal to each other and each being orthogonal to the first direction, each shaft extending in depth along the first direction through the active multi-layers and the dielectric layers, and having a predetermined extent along the second direction;

providing a plurality of trenches in the semiconductor structure each extending in depth along the first direction and in length along the third direction, each trench (a) intersecting a plurality of the shafts in the second direction, and (b) having a width along the second direction that is less than the extent of each shaft in the second direction; and forming, in either (i) each shaft, or (ii) portions of each trench between adjacent shafts: (a) a semiconductor layer, the semiconductor layer being formed adjacent to and in contact with the first and second conductive layers of each active multi-layer, (b) a storage layer adjacent the semiconductor layer; and (c) a conductor layer in contact with the storage layer, wherein the first and the second conductive layers of each active multi-layer, the semiconductor layer, the storage layer, and the conductor layer provide, respectively, a common bit line, a common source line, a channel region, a data storage layer and a gate electrode of a thin-film storage transistor in a NOR memory string.

2. The process of claim 1 wherein, when the semiconductor layer is formed within each shaft, the portions of each trench between adjacent shafts are filled by an isolation material.

3. The process of claim 1 wherein, when the semiconductor layer is formed within the portions of each trench between adjacent shafts, each shaft is filled by an isolation material.

4. The process of claim 1, wherein the active multi-layers each further comprises an additional conductor layer adjacent and in contact with at least one of the first and the second conductive layers.

5. The process of claim 1, wherein the conductor layer is formed by replacing a sacrificial layer in each active multi-layer by removing the sacrificial layer through the shafts, or through the portions of each trench between adjacent shafts, and depositing a conductor material by atomic layer deposition (ALD).

6. The process of claim 5, wherein the conductor material comprises tungsten.

7. The process of claim 1, wherein the dielectric material comprises silicon oxycarbide (SiOC).

8. The process of claim 1, wherein the storage layer comprises a tunneling layer, a charge storage layer and a blocking layer.

9. The process of claim 8, wherein the tunneling layer comprises one or more of: any silicon oxide ($SiO_x$), silicon nitride (SiN), silicon oxynitride (SiON), any aluminum oxide ($AlO_x$), any hafnium oxide ($HfO_x$), zirconium oxide ($ZrO_x$), any hafnium silicon oxide ($HfSi_xO_y$), and any hafnium zirconium oxide (HfZrO).

10. The process of claim 9, wherein the blocking layer comprises one or more of: any silicon oxide ($SiO_x$) and aluminum oxide ($AlO_x$).

11. The process of claim 8, wherein the charge storage layer comprises one or more of: silicon nitride (SiN), hafnium oxide ($HfO_2$), and hafnium silicon oxynitride (HfSiON).

12. The process of claim 1, wherein the conductor layer comprises a metal liner and a refractory metal.

13. The process of claim 12, wherein the metal liner comprises one or more of: titanium (Ti), titanium nitride (TiN), tantalum (Ta) and tantalum nitride (TaN).

14. The process of claim 12, wherein the refractory metal comprises one or more of: tungsten (W), tungsten nitride (WN) and molybdenum (Mo).

15. The process of claim 1, further comprising, prior to providing the trenches in the semiconductor structure, lining the shafts with a dielectric liner.

16. The process of claim 15, wherein the dielectric liner comprises an oxide liner.

17. The process of claim 16 wherein, when the semiconductor layer is formed within the shafts, forming the semiconductor layer comprises:
removing the sacrificial material from the shafts;
recessing the first and the second conductive layers and the dielectric layer in each active multi-layer to create a cavity; and
depositing the semiconductor layer into the cavity.

18. The process of claim 17, wherein the storage layer is conformally deposited on the sidewalls of the shafts.

19. The process of claim 18, wherein the conductor layer is formed by depositing a conductive material to fill each shaft after forming the storage layer.

20. The process of claim 15, further comprising filling the shafts with a sacrificial material.

21. The process of claim 20, wherein the sacrificial material comprises carbon or tungsten (W).

22. The process of claim 21, further providing an adhesive layer of titanium nitride to surround the sacrificial material.

23. The process of claim 1 wherein, when the semiconductor layer is formed with the portions of each trench between adjacent shafts, forming the semiconductor layer comprises:
through exposed portions of each trench between adjacent shafts, recessing the first and the second conductive layers and the dielectric layer in each active multi-layer to create a cavity; and
depositing the semiconductor layer into the cavity.

24. The process of claim 23, wherein the storage-layer is conformally deposited on the sidewalls of the portions of each trench between adjacent shafts.

25. The process of claim 24, wherein the conductor layer is formed by depositing a conductive material to fill each portion of each trench between adjacent shafts after forming the storage layer.

26. The process of claim 25, further comprising filling the shafts by an isolation material.

27. The process of claim 1, further comprising providing an etch-stop layer between the first and the second conductive layers and the planar surface of the semiconductor substrate.

28. The process of claim 27, wherein the etch-stop layer includes one or more of tungsten (W), tungsten nitride (WN), aluminum oxide (AlO) or aluminum nitride (AlN).

29. The process of claim 27, further comprising a pad oxide layer between the etch-stop layer and the planar surface of the semiconductor substrate.

30. The process of claim 1, wherein the first and the second conductive layers each comprise a semiconductor material of a first conductivity type.

31. The process of claim 30, wherein the semiconductor layer comprises a semiconductor material of a second conductivity type opposite the first conductivity type.

\* \* \* \* \*